United States Patent
Xiong et al.

(10) Patent No.: US 10,985,883 B2
(45) Date of Patent: Apr. 20, 2021

(54) APPARATUS AND METHOD FOR RETRANSMISSION IN WIRELESS COMMUNICATION SYSTEM

(71) Applicant: Samsung Electronics Co., Ltd., Suwon-si (KR)

(72) Inventors: Qi Xiong, Beijing (CN); Bin Yu, Beijing (CN); Chen Qian, Beijing (CN); Chenxi Hao, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 16/324,478

(22) PCT Filed: Aug. 8, 2017

(86) PCT No.: PCT/KR2017/008572
§ 371 (c)(1),
(2) Date: Feb. 8, 2019

(87) PCT Pub. No.: WO2018/030764
PCT Pub. Date: Feb. 15, 2018

(65) Prior Publication Data
US 2019/0182006 A1    Jun. 13, 2019

(30) Foreign Application Priority Data

Aug. 9, 2016   (CN) .......................... 201610647222.1
Aug. 4, 2017   (KR) ........................ 10-2017-0098945

(51) Int. Cl.
*H04W 72/04*   (2009.01)
*H04L 5/00*    (2006.01)
*H04L 1/18*    (2006.01)

(52) U.S. Cl.
CPC .......... *H04L 5/0048* (2013.01); *H04L 1/1861* (2013.01); *H04L 1/1893* (2013.01); *H04L 5/0055* (2013.01); *H04W 72/042* (2013.01)

(58) Field of Classification Search
CPC ........... H04W 72/042; H04W 72/1289; H04W 74/0833; H04W 88/02; H04W 88/08;
(Continued)

(56) References Cited

U.S. PATENT DOCUMENTS

2011/0119548 A1    5/2011 Imamura et al.
2011/0246846 A1*   10/2011 Ojala ................... H04L 1/1887
                                                        714/748
(Continued)

FOREIGN PATENT DOCUMENTS

WO    2015114952 A1    8/2015

OTHER PUBLICATIONS

ISA/KR, "International Search Report and Written Opinion of the International Searching Authority," International Application No. PCT/KR2017/008572, dated Nov. 23, 2017, 9 pages.
(Continued)

*Primary Examiner* — Sai Aung

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present disclosure relates to the retransmission in wireless communication system. A method of operating a base station comprises transmitting resource configuration information related to a resource for an initial transmission and a resource for a retransmission to a terminal, receiving initially-transmitted data through a first resource, and receiving retransmitted data through a second resource, if a decoding of the initially-transmitted data fails. The second resource is (Continued)

determined based on the first resource and the resource configuration information.

18 Claims, 24 Drawing Sheets

(58) Field of Classification Search
CPC ..... H04W 4/70; H04W 72/04; H04W 72/048; H04L 5/0048; H04L 5/0051; H04L 25/0224; H04L 5/0091; H04L 1/0026; H04L 1/1812
See application file for complete search history.

(56) References Cited

U.S. PATENT DOCUMENTS

| | | |
|---|---|---|
| 2012/0327839 A1 | 12/2012 | Miki et al. |
| 2013/0142160 A1* | 6/2013 | Hoshino ........... H04L 25/03929 370/329 |
| 2013/0148593 A1* | 6/2013 | Suzuki ................. H04L 5/0051 370/329 |
| 2014/0211745 A1 | 7/2014 | Lee et al. |
| 2016/0112994 A1* | 4/2016 | Wang .................... H04L 5/0094 370/329 |
| 2017/0055249 A1 | 2/2017 | Yasukawa et al. |
| 2018/0278365 A1* | 9/2018 | Liu ....................... H04L 1/1893 |

OTHER PUBLICATIONS

Ping, Li, et al., "Interleave-Division Multiple-Access," IEEE Transactions on Wireless Communications, vol. 5, No. 4, Apr. 2006, 10 pages.

* cited by examiner

[Fig. 1]
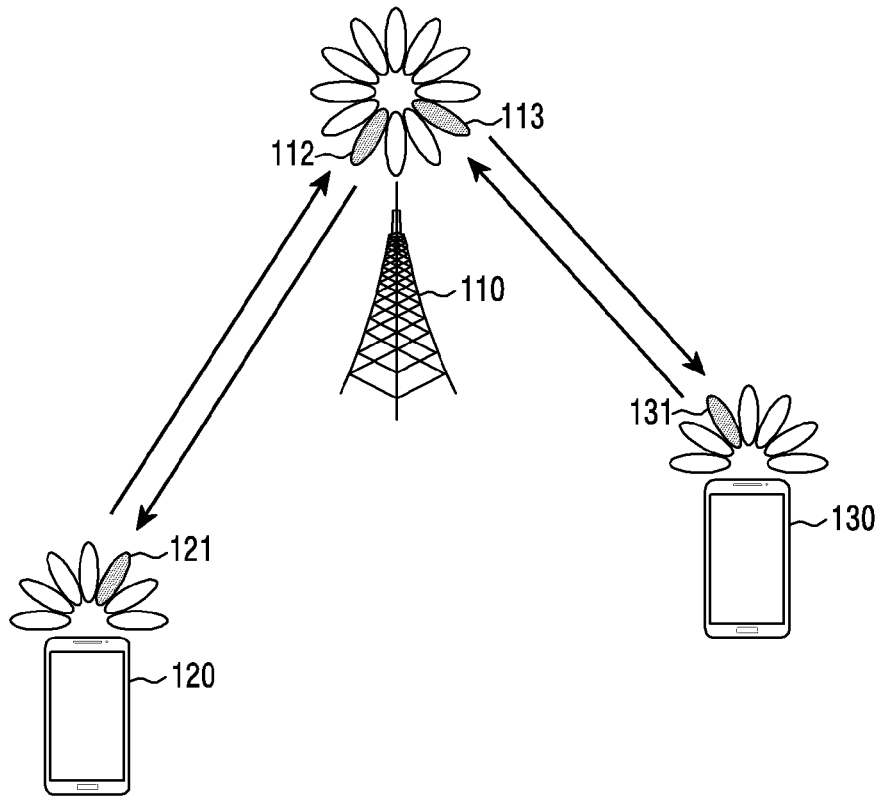
[Fig. 2]
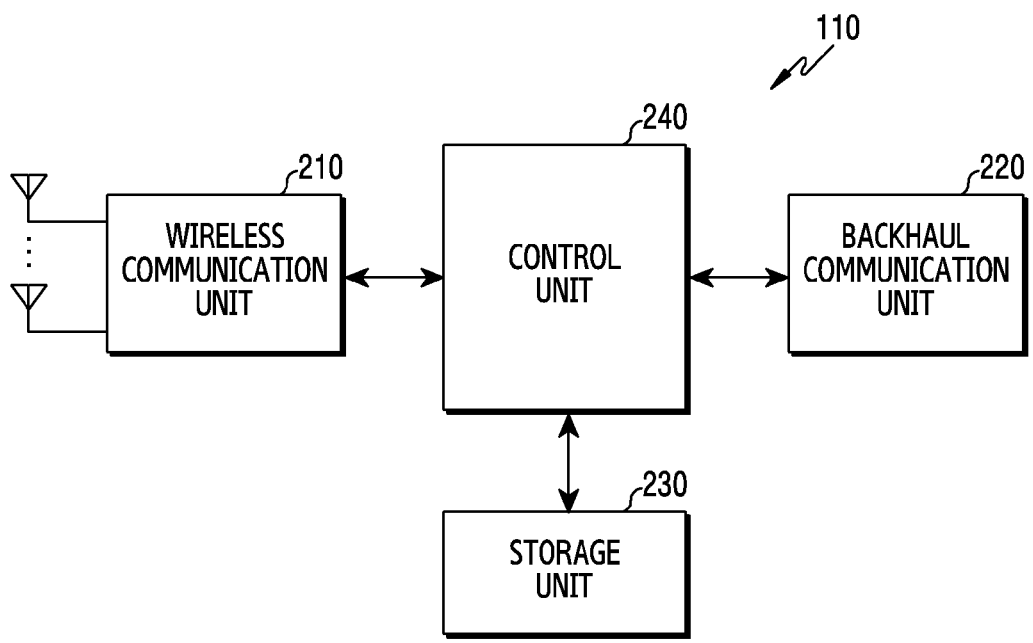

[Fig. 3]
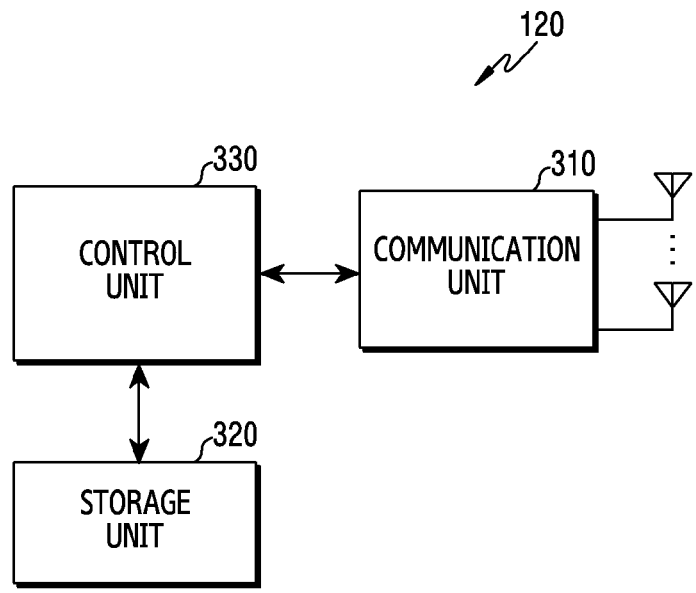
[Fig. 4]
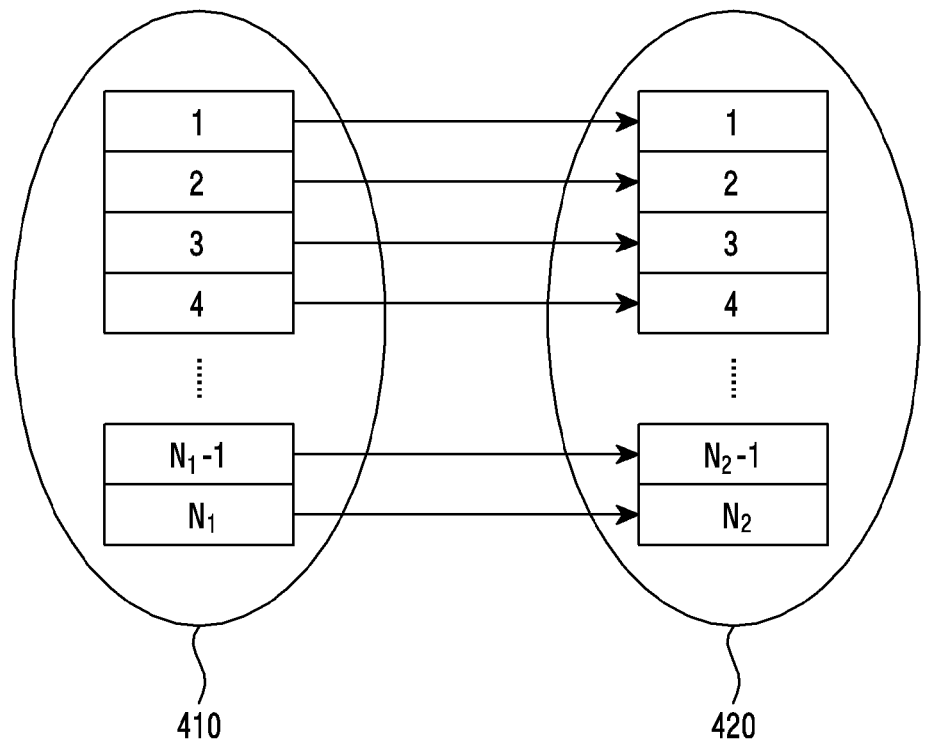

[Fig. 5]
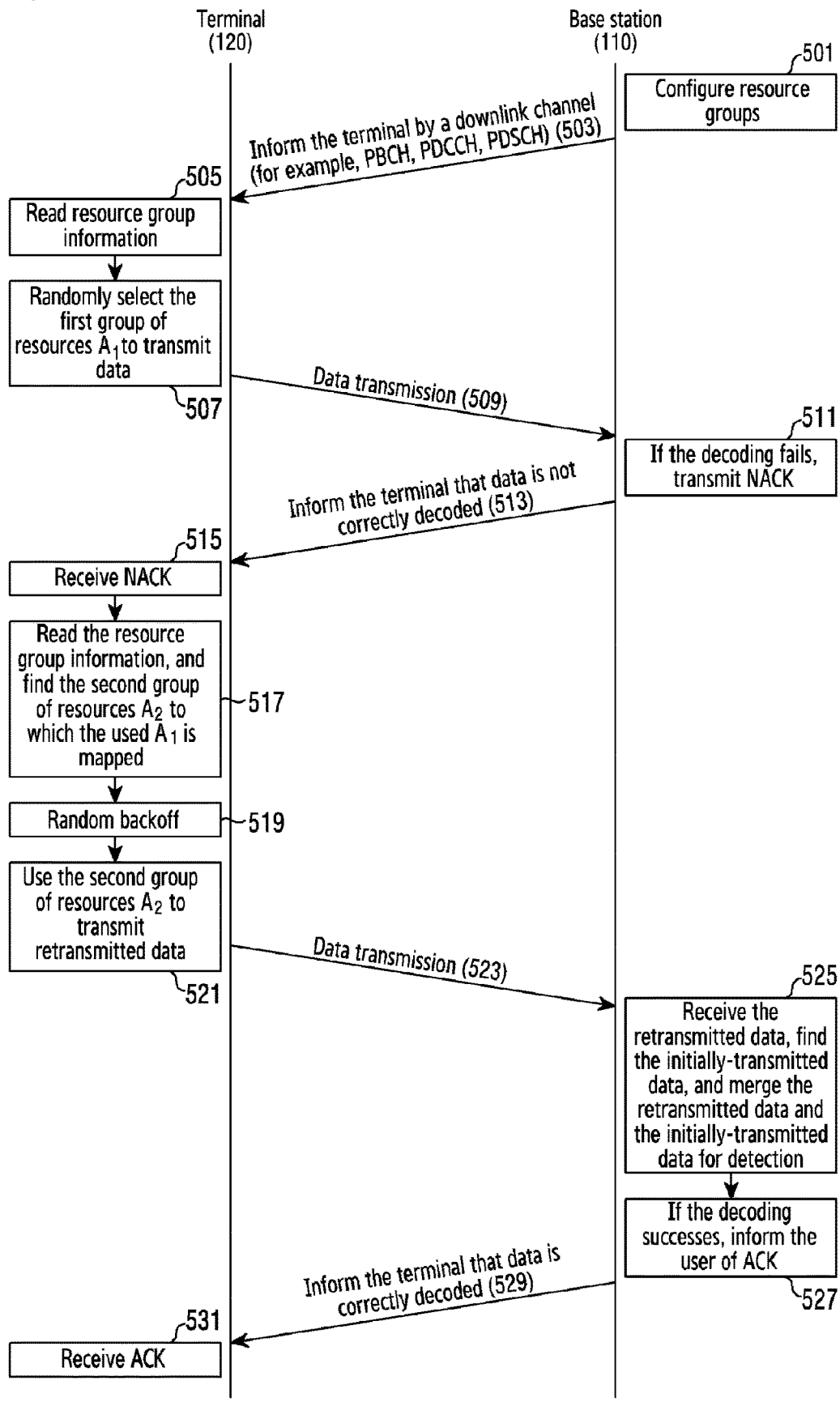

[Fig. 6]
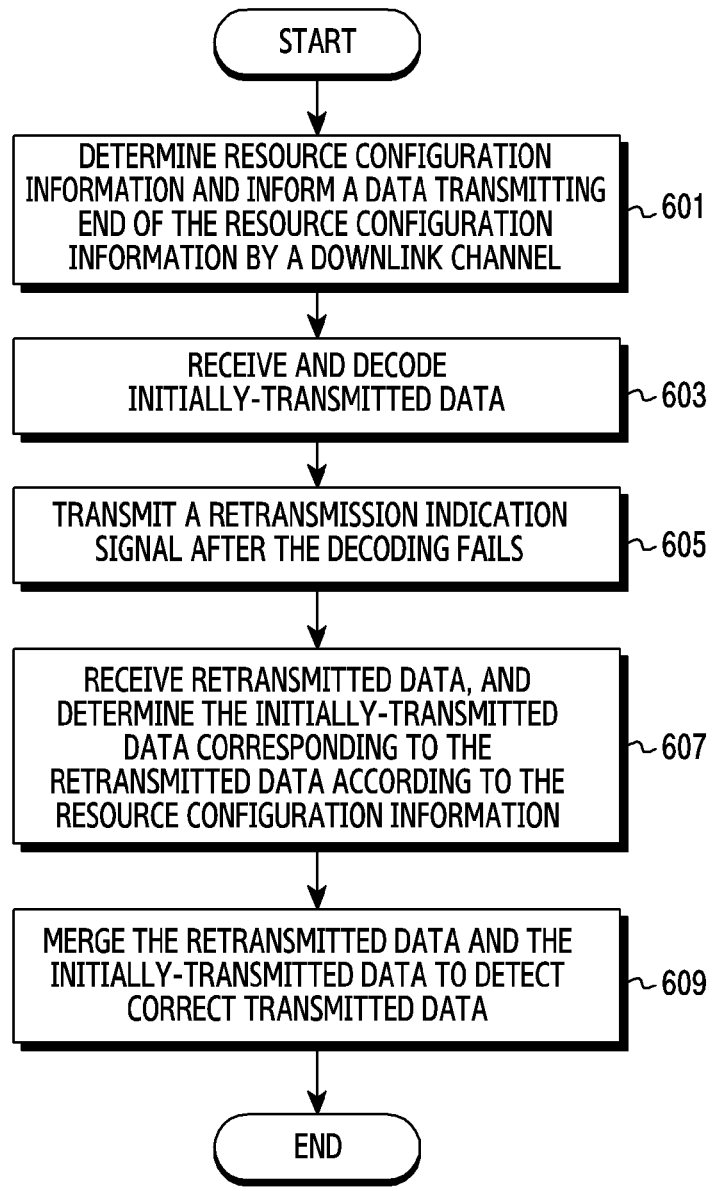

[Fig. 7]
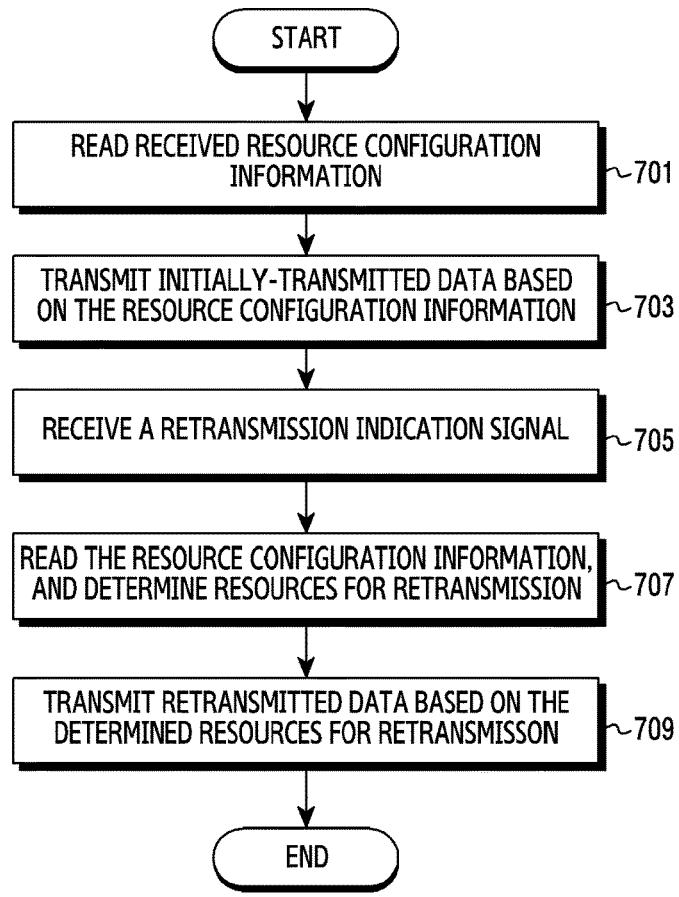
[Fig. 8]
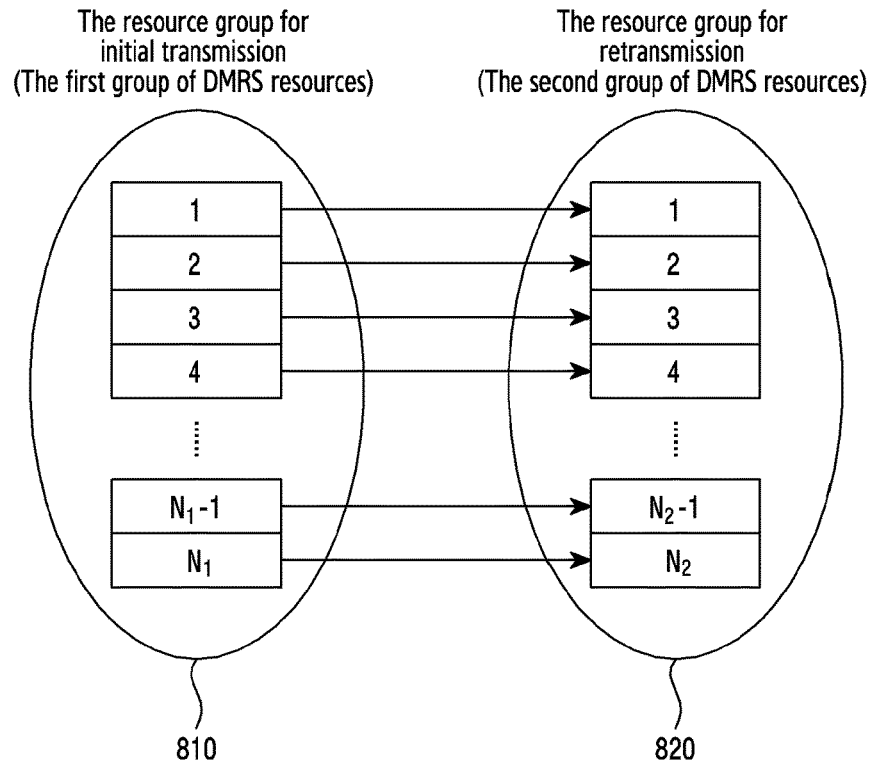

[Fig. 9]
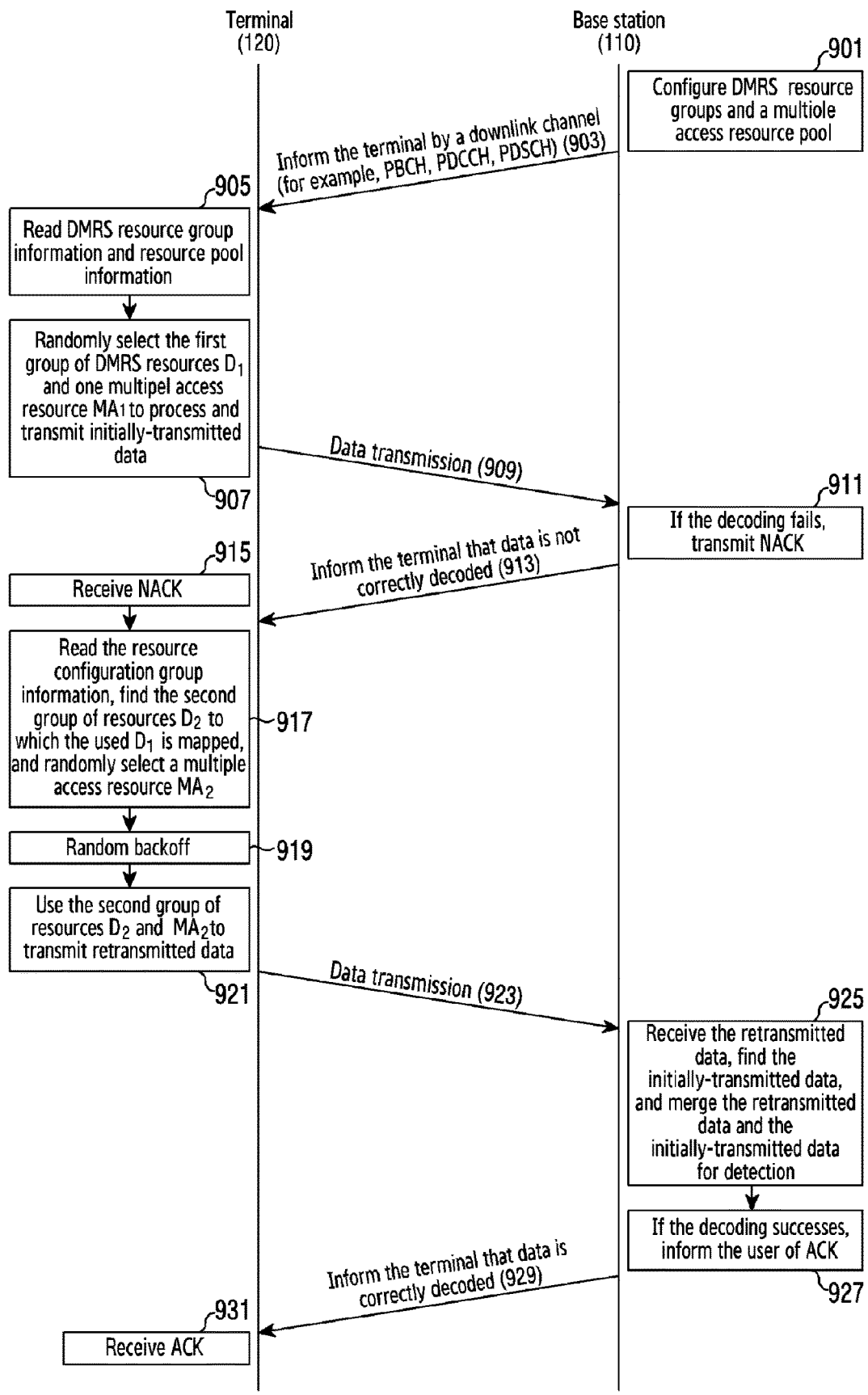

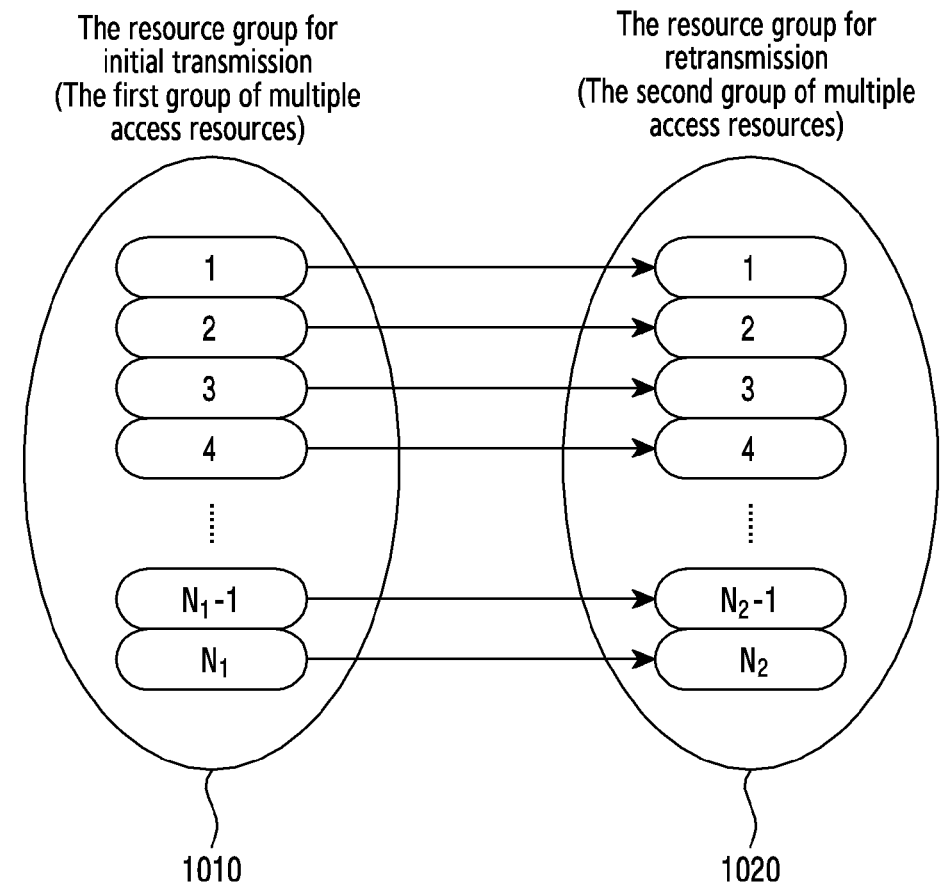

[Fig. 11]
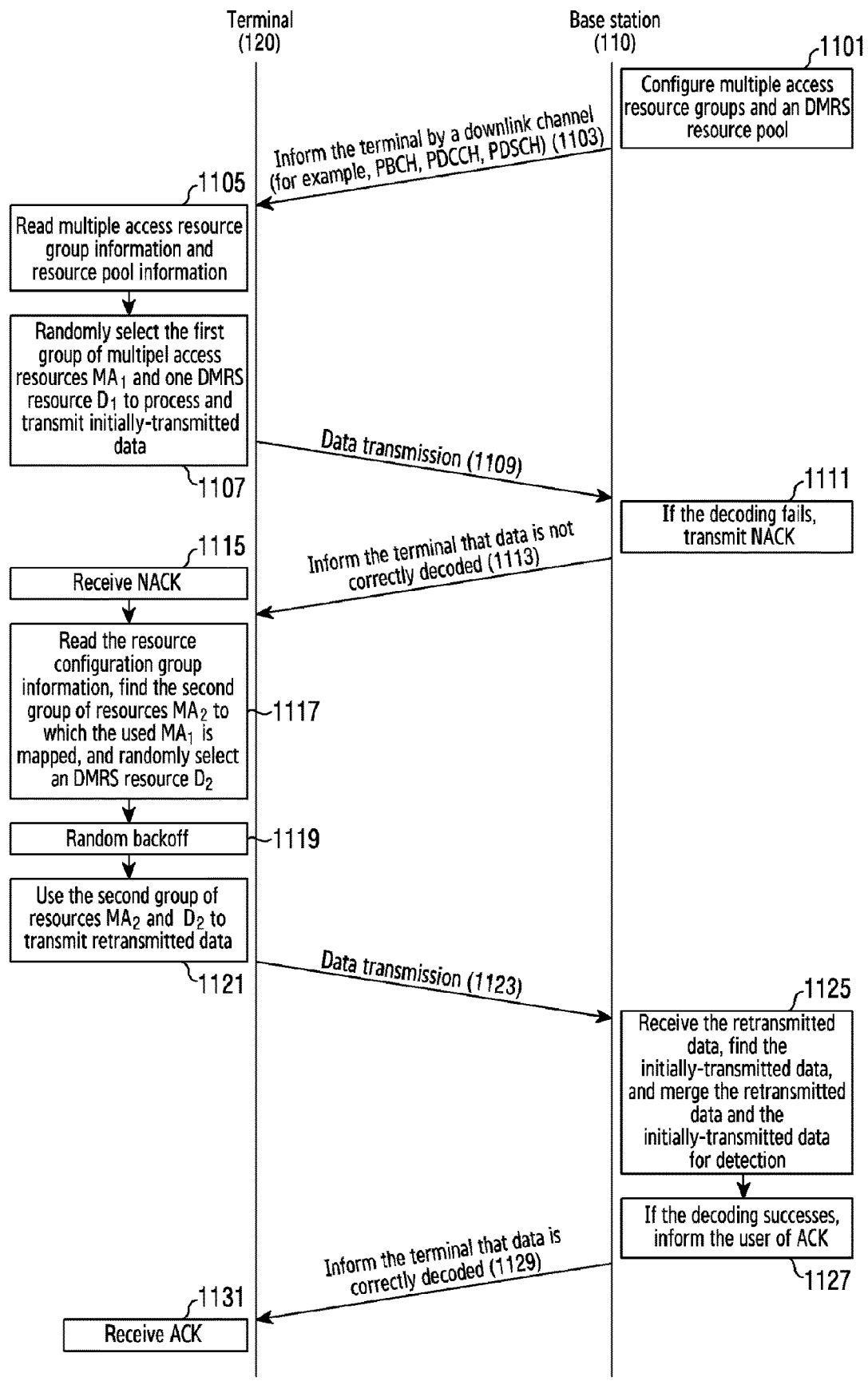

[Fig. 12A]
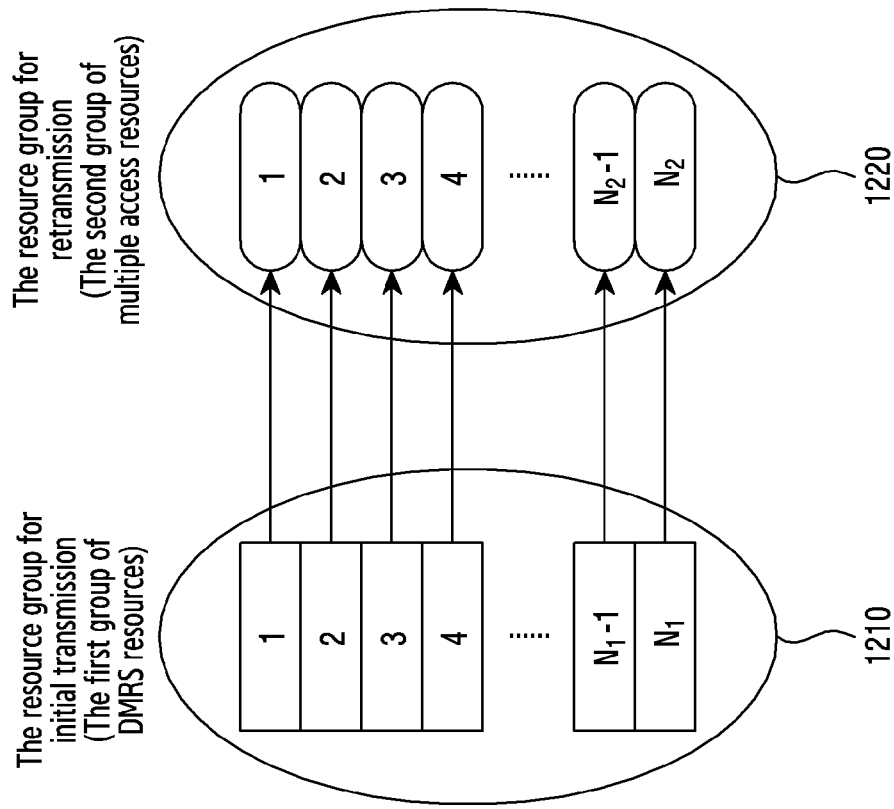
[Fig. 12B]
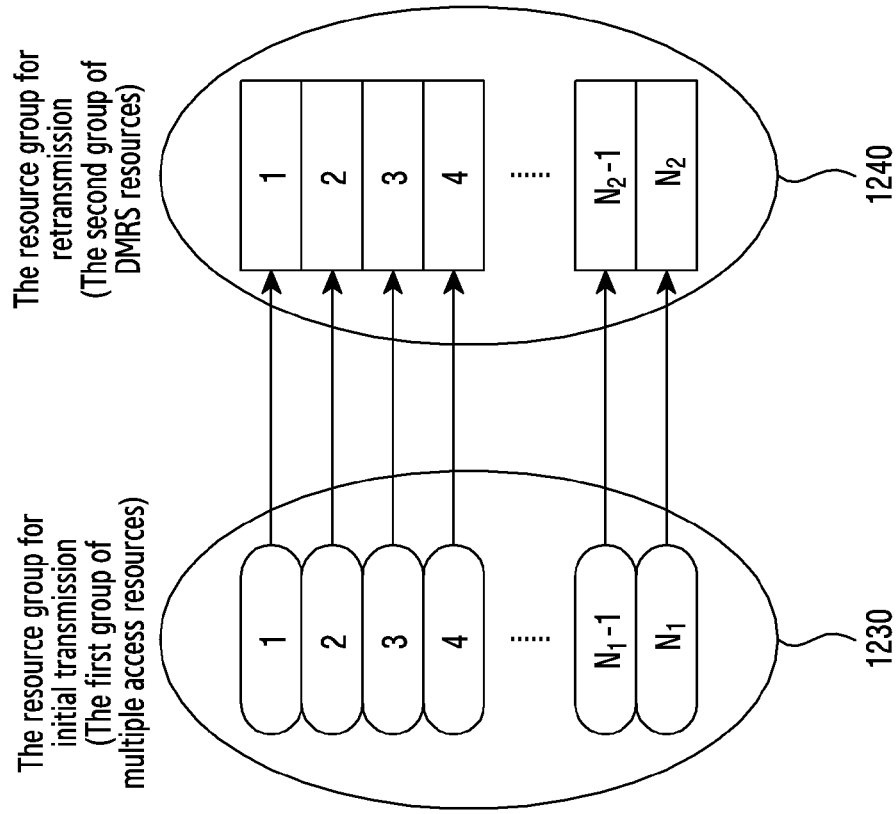

[Fig. 13]
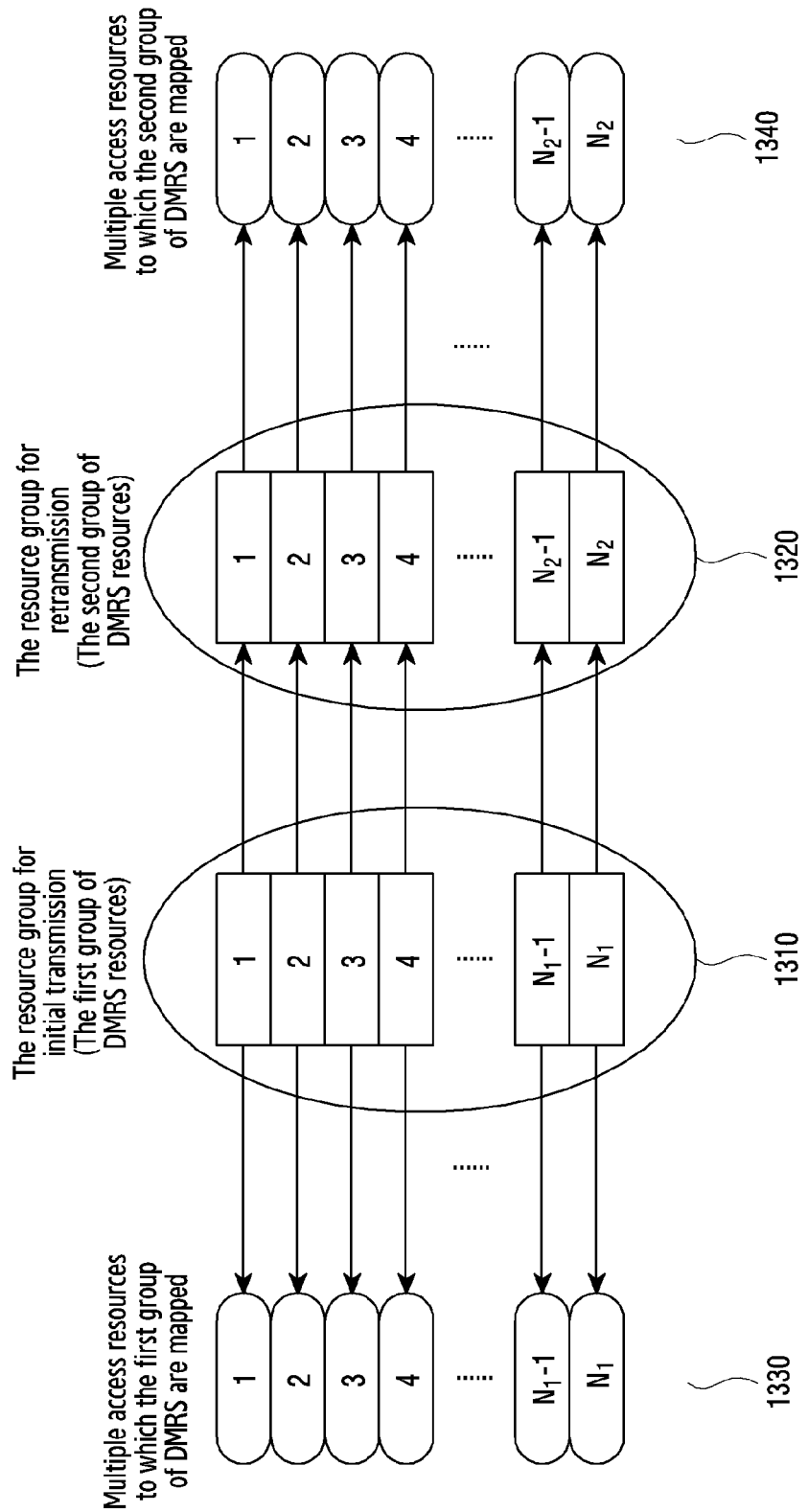

[Fig. 14]
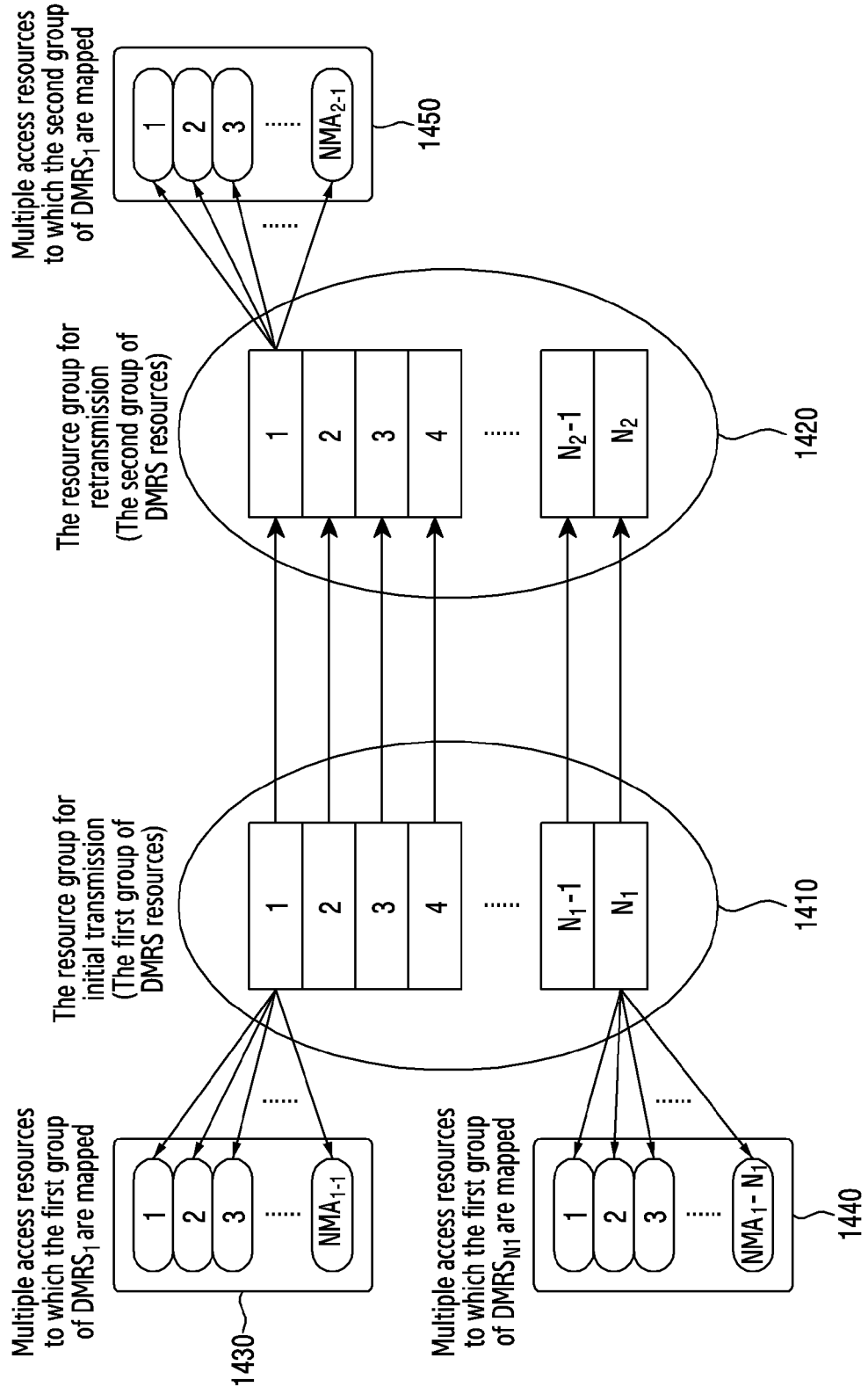

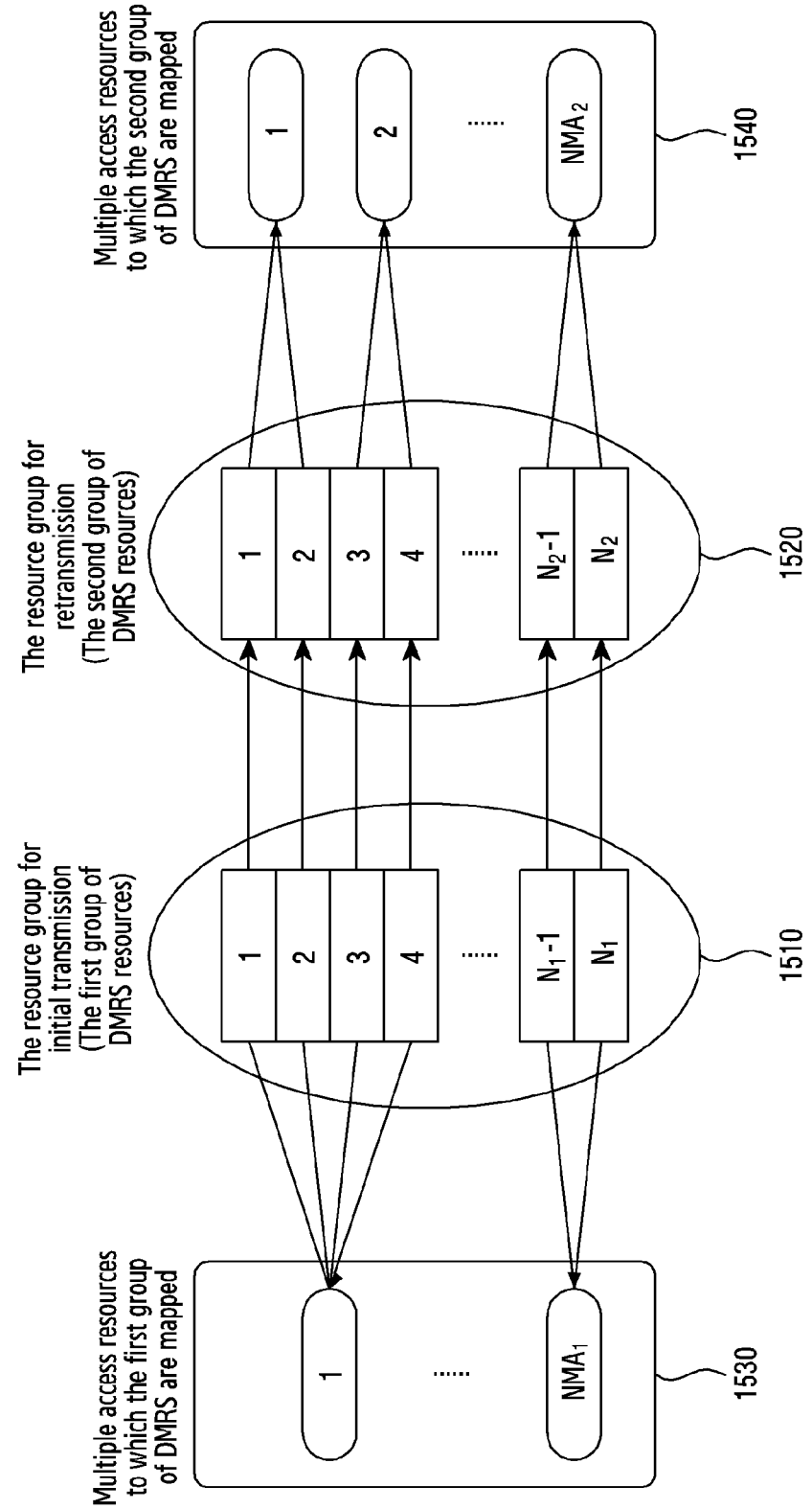
[Fig. 15]

[Fig. 16]
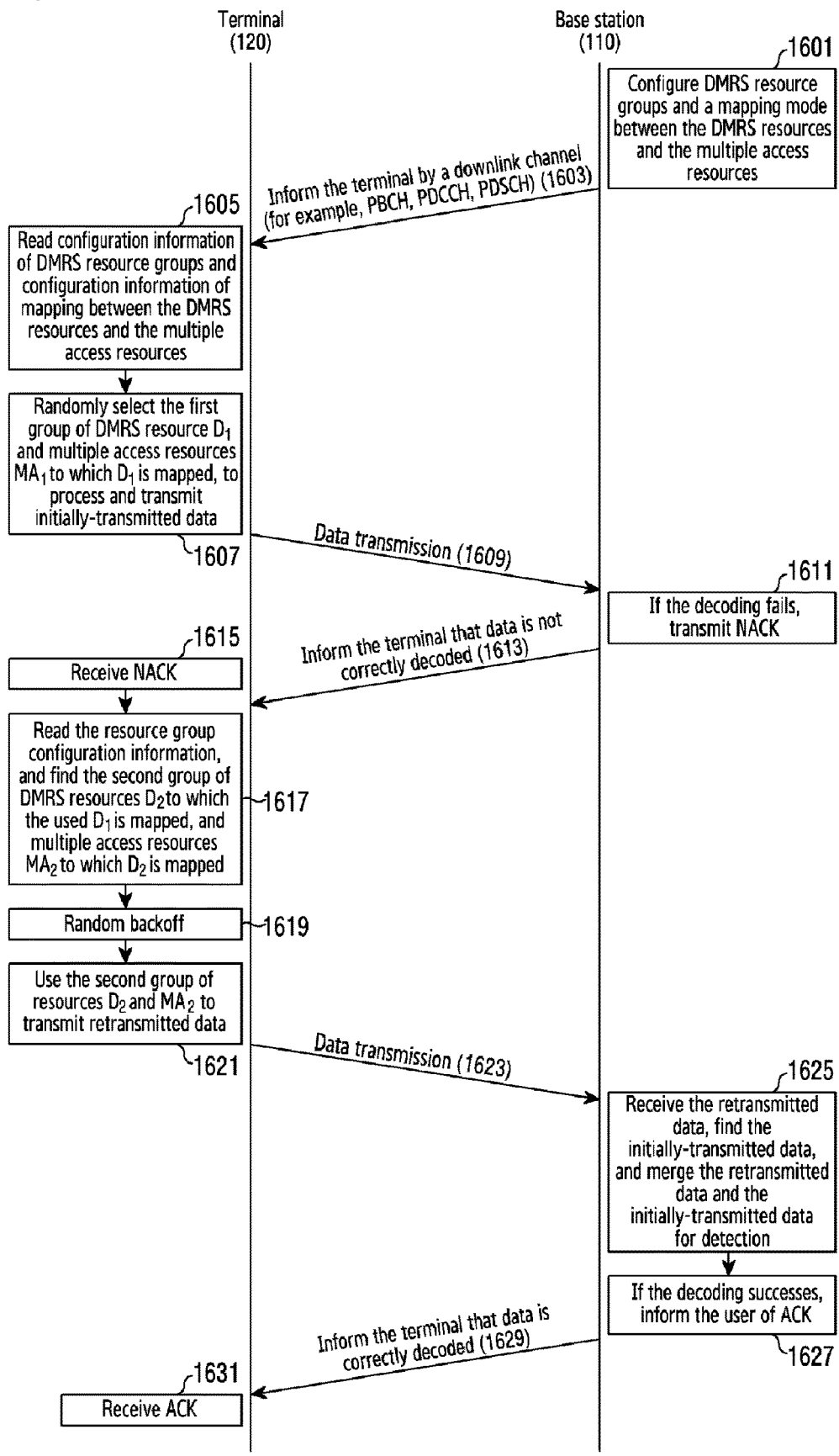

[Fig. 17]
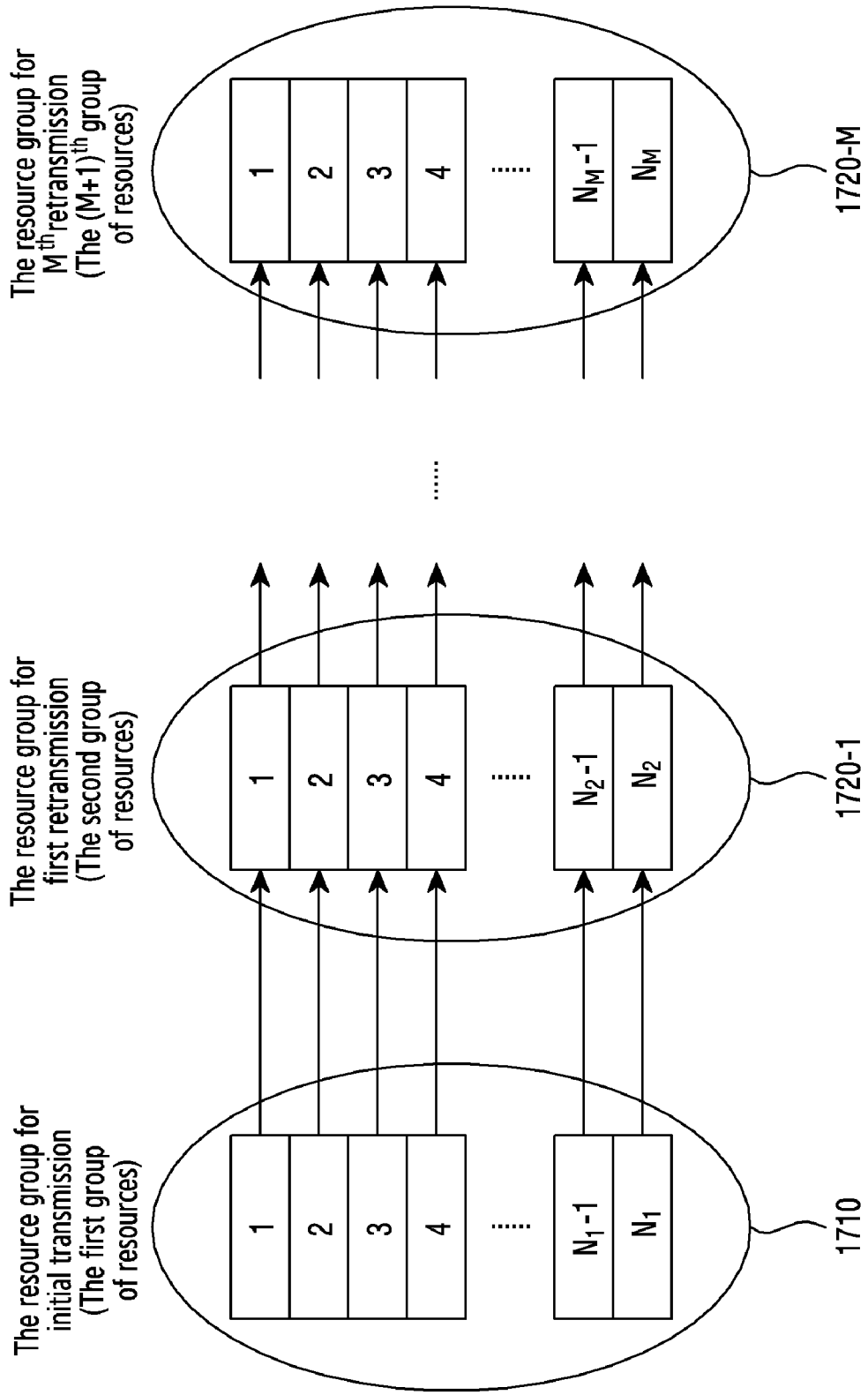

[Fig. 18]
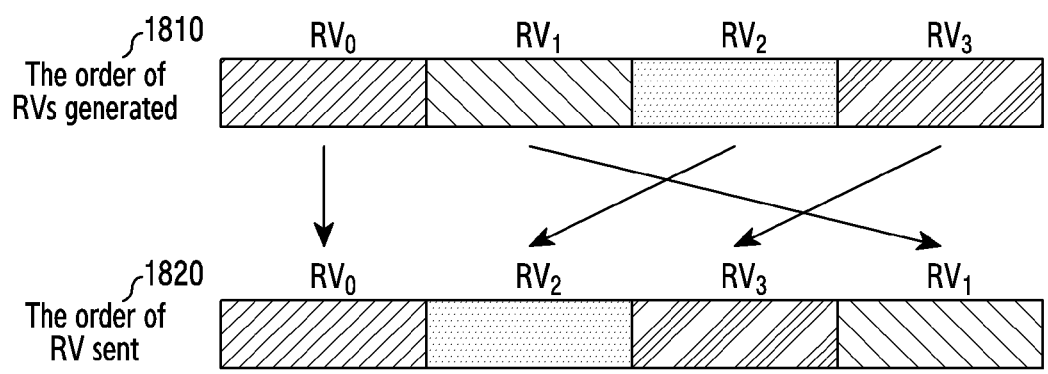

[Fig. 19]
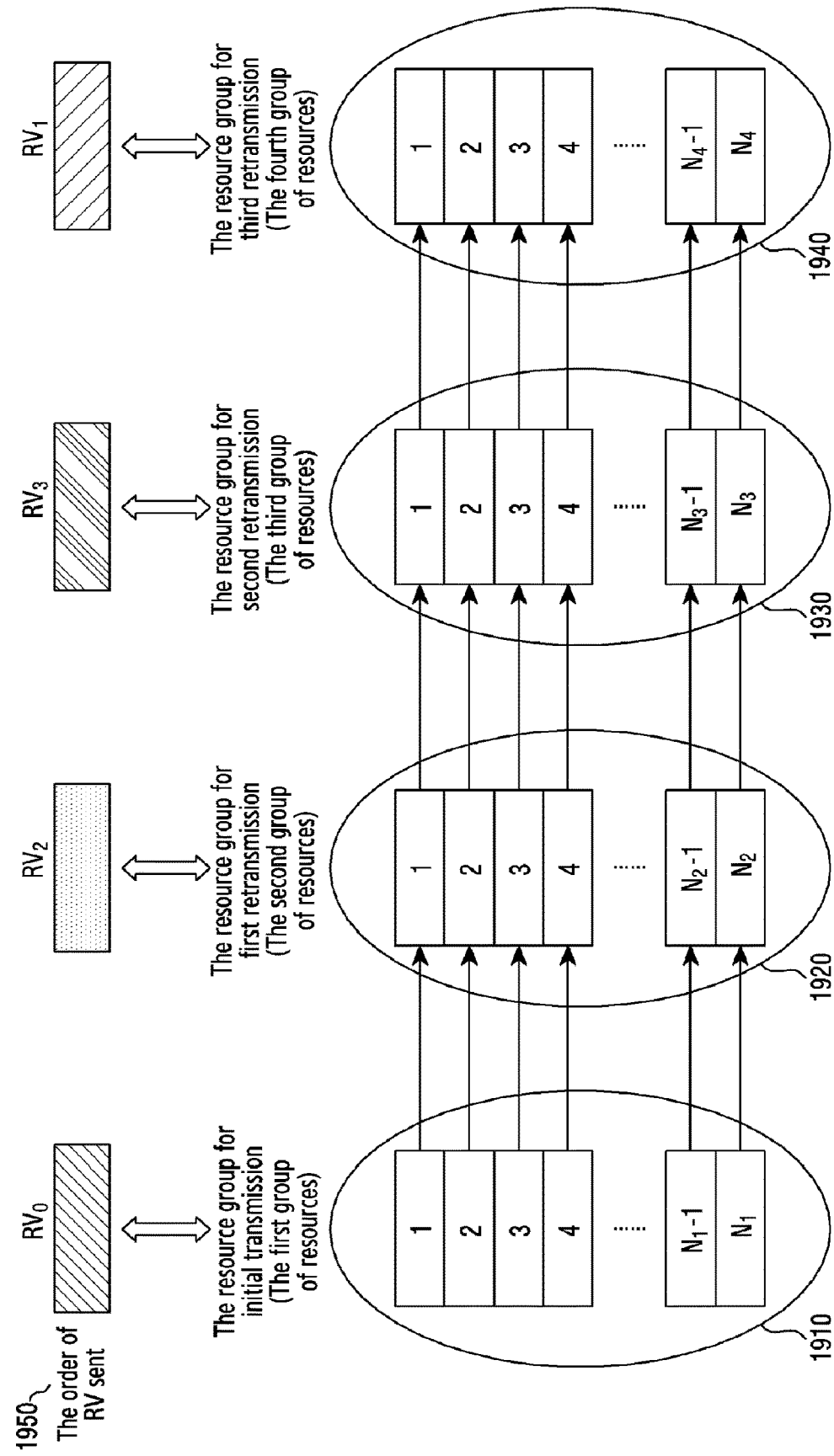

[Fig. 20A]
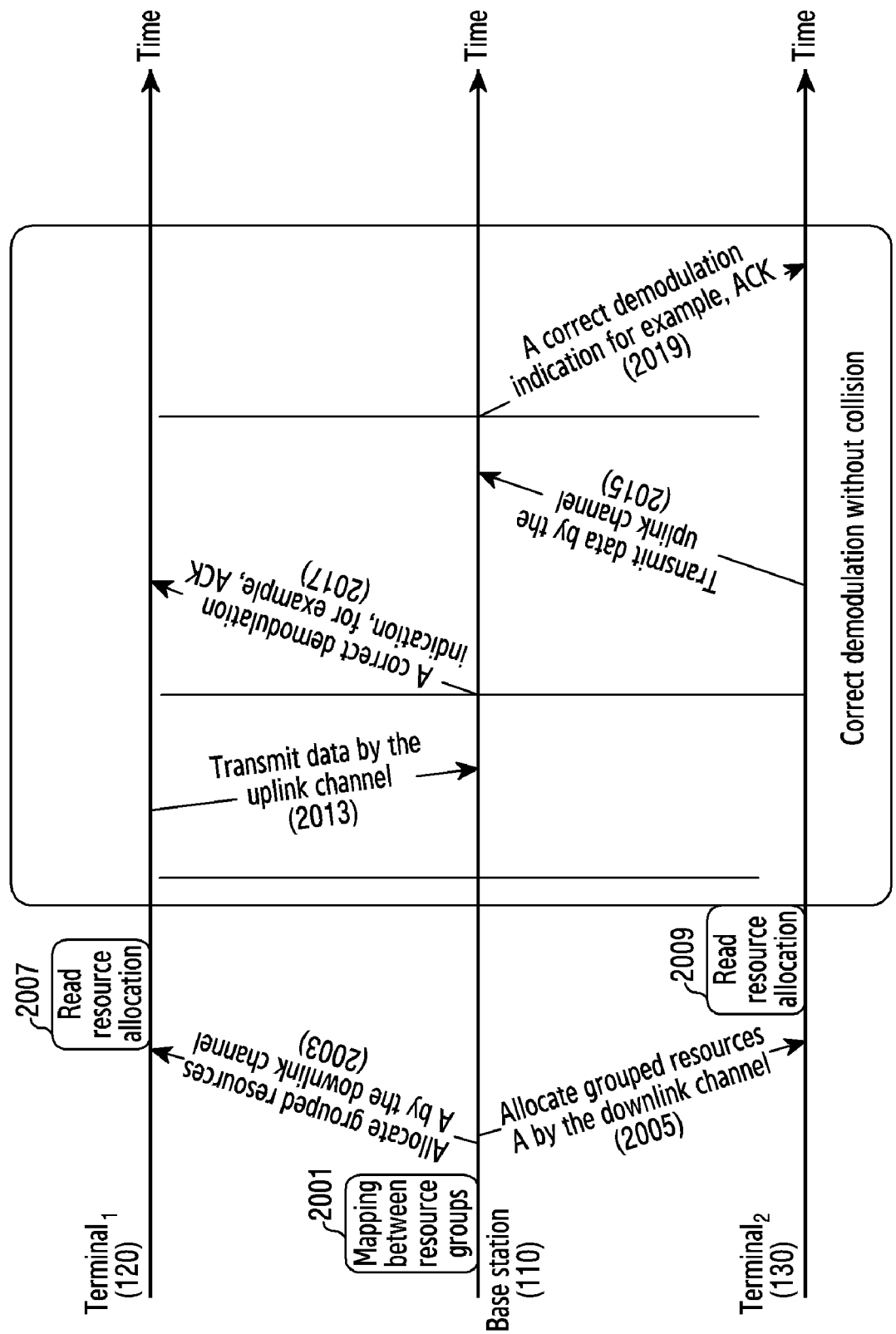

[Fig. 20B]
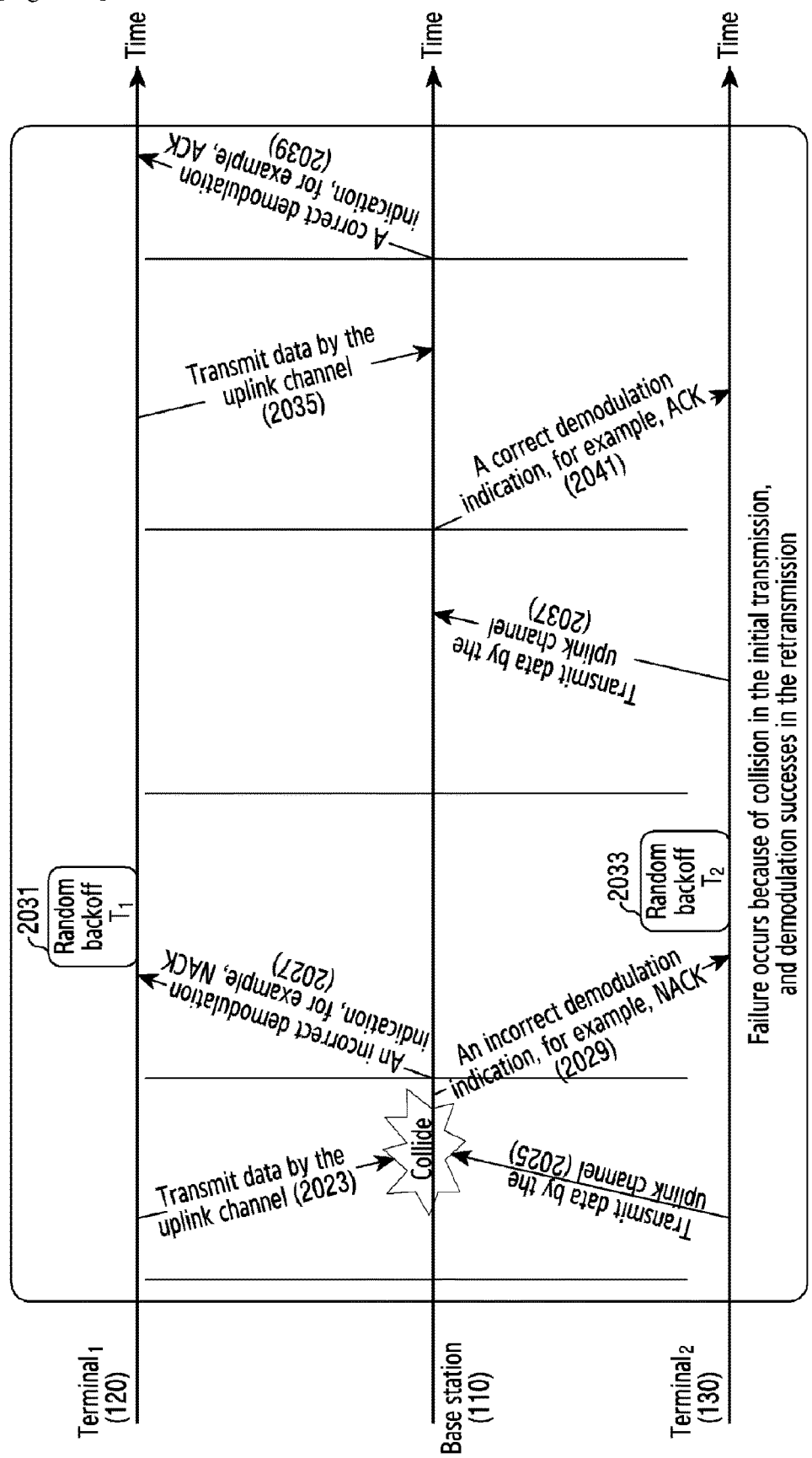

[Fig. 21]
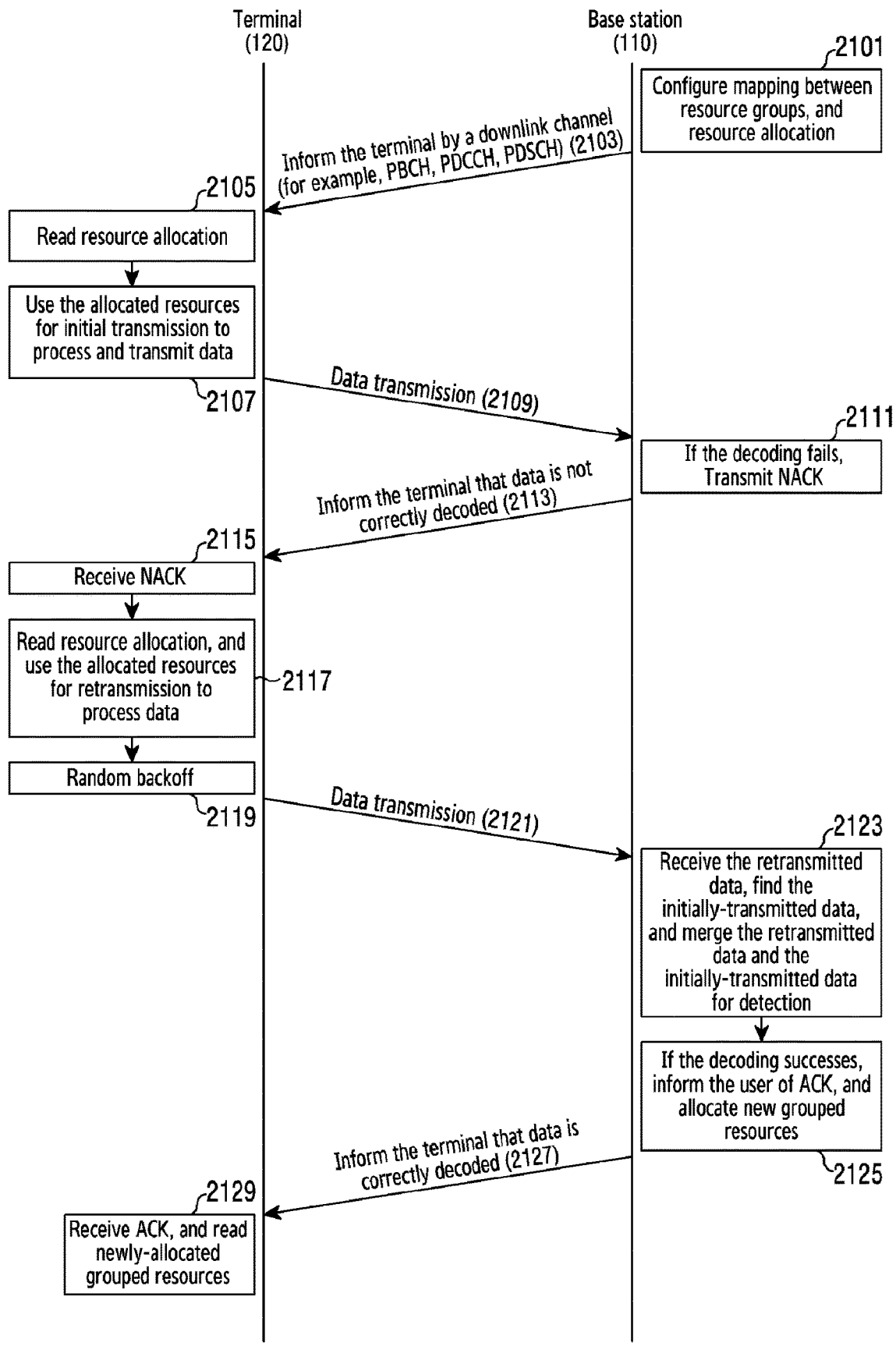

[Fig. 22A]
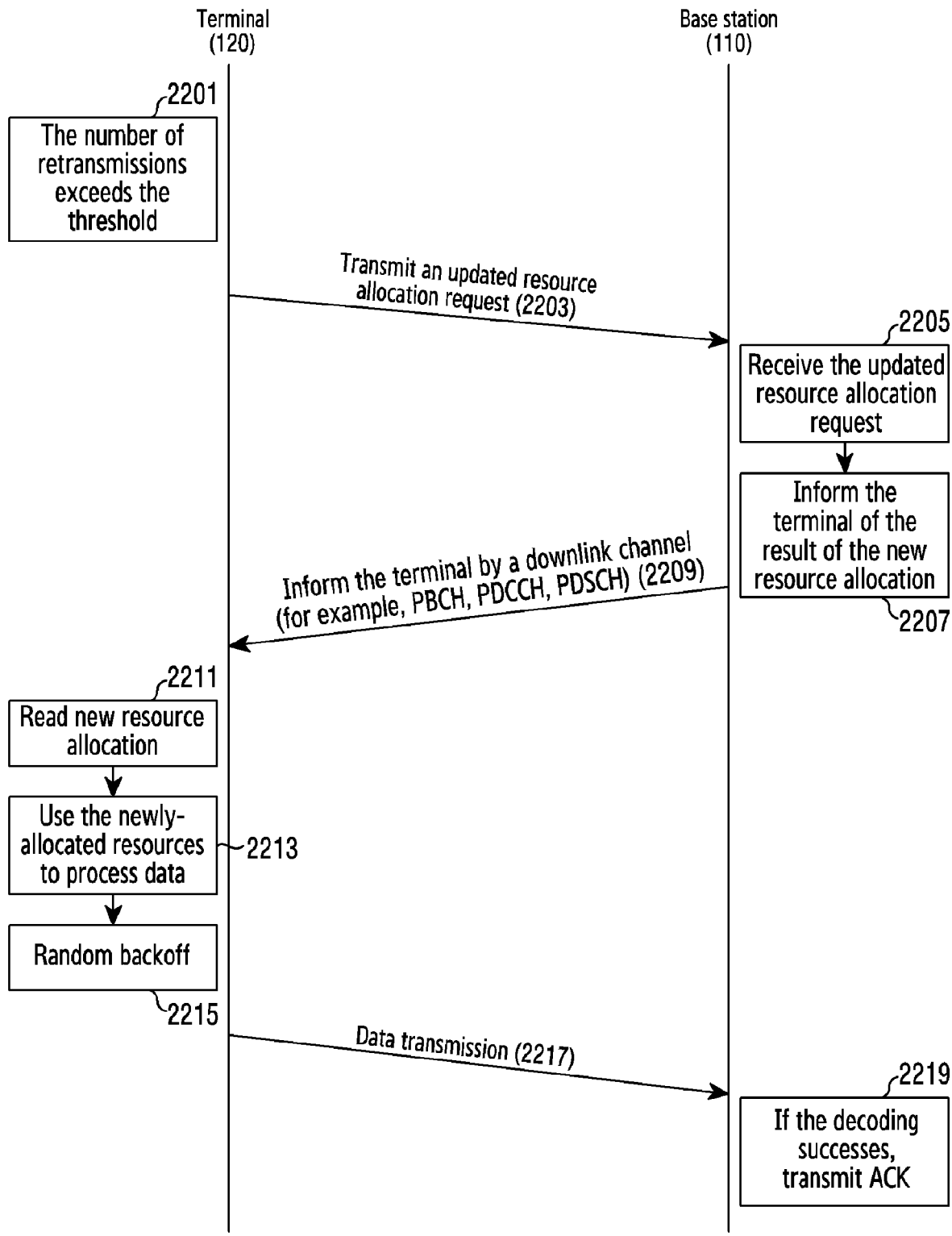

[Fig. 22B]
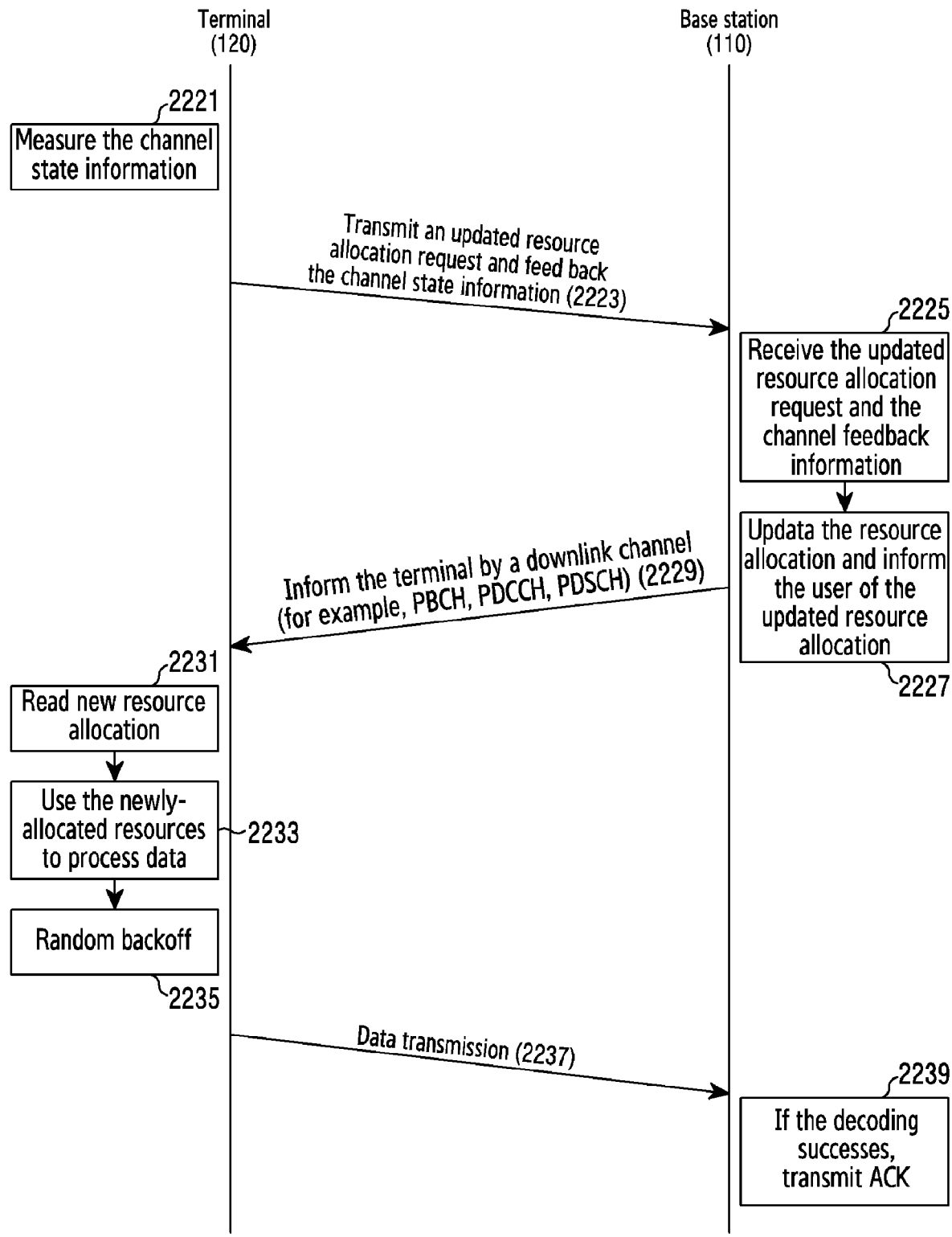

[Fig. 23]
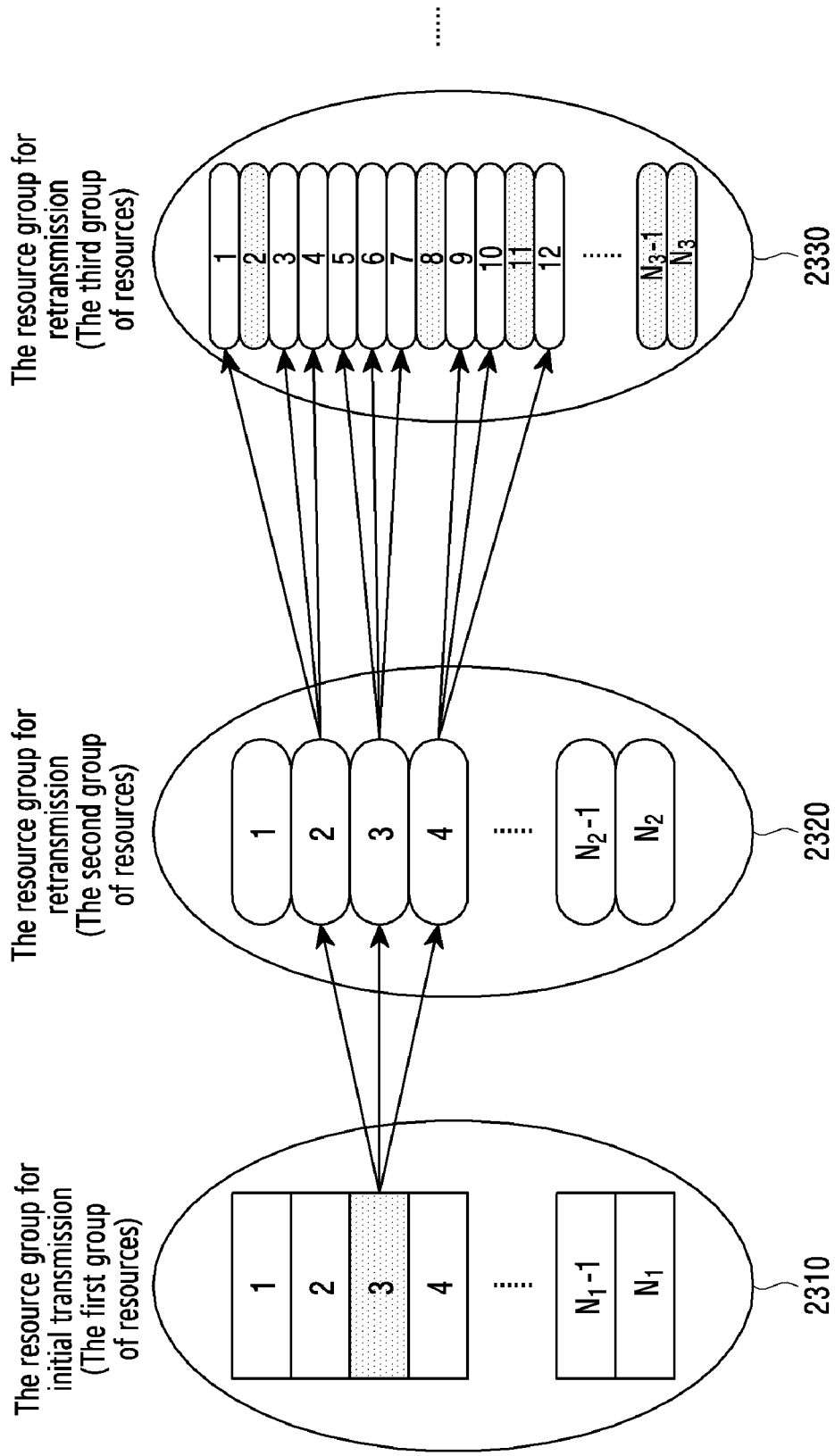

[Fig. 24]
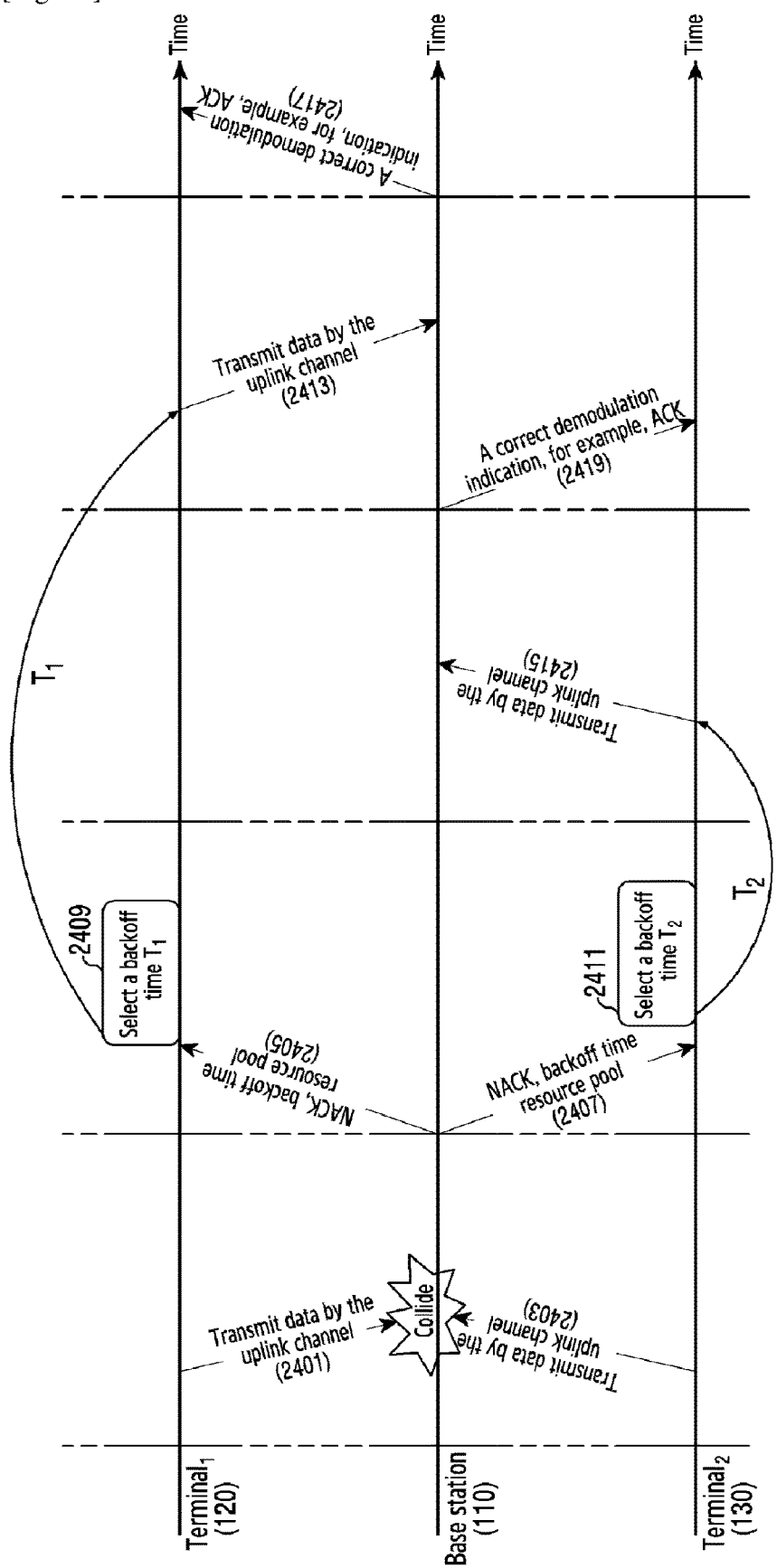

[Fig. 25]
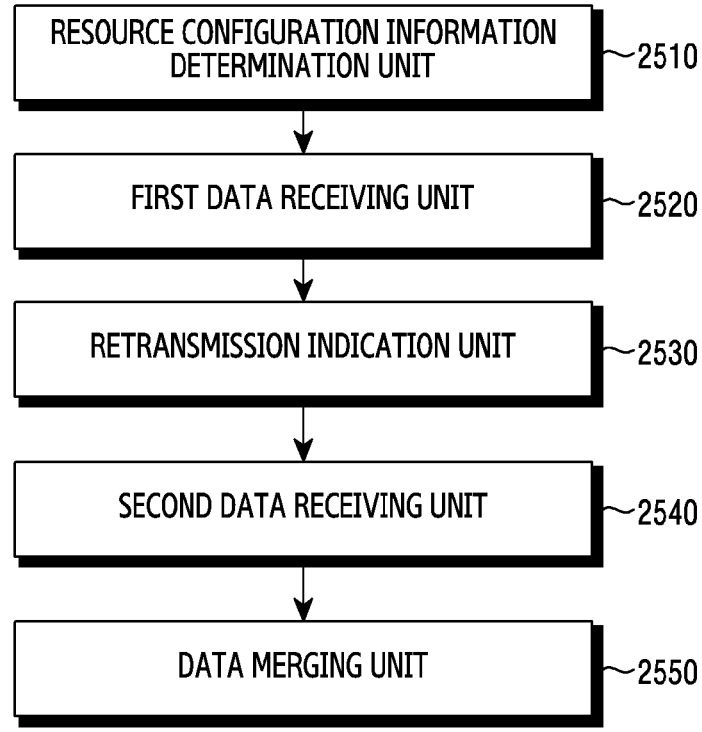
[Fig. 26]
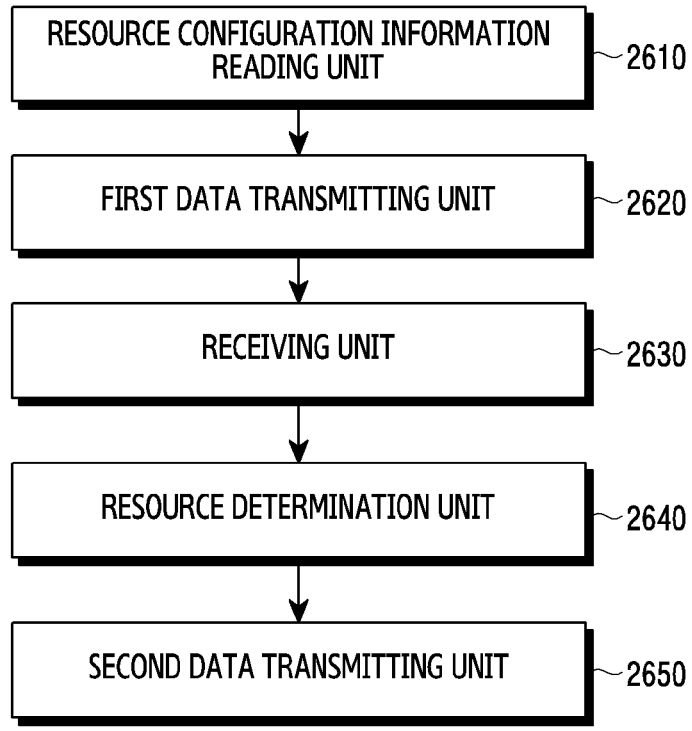

APPARATUS AND METHOD FOR RETRANSMISSION IN WIRELESS COMMUNICATION SYSTEM

CROSS-REFERENCE TO RELATED APPLICATIONS

This application is a 371 National Stage of International Application No. PCT/KR2017/008572, filed Aug. 8, 2017, which claims priority to Chinese Patent Application No, 201610647222.1, filed Aug. 9, 2016 and Korean Patent Application No. 10-2017-0098945, filed Aug. 4, 2017 the disclosures of which are herein incorporated by reference in their entirety.

BACKGROUND

1. Field

The present disclosure generally relates to a wireless communication system, and in particular to an apparatus and a method for a retransmission in the wireless communication system.

2. Description for Related Background Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "beyond 4G network" or a "post long term evolution (LTE) System."

The 5G communication system is considered to be implemented in higher frequency (mmWave) bands, 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

To address the above-discussed deficiencies, the present disclosure provides an apparatus and method for efficiently performing retransmission in a wireless communication system.

The present disclosure also provides an apparatus and method for performing data retransmission for non-orthogonal multiple access in a wireless communication system.

The present disclosure also provides an apparatus and method for resolving conflicts that occur if initially-transmitted data and retransmitted data are transmitted in a wireless communication system.

The present disclosure also provides an apparatus and method for combining the initially-transmitted data and the retransmitted data to detect correct transmission data in a wireless communication system.

According to various embodiments of the present disclosure, a method of operating a base station in a wireless communication system includes transmitting, to a terminal, a resource configuration information related to a resource for initial transmission and a resource for retransmission, receiving initially-transmitted data through a first resource, and receiving retransmitted data through a second resource, if a decoding of the initially-transmitted data fails. The second resource is determined based on the first resource and the resource configuration information.

According to various embodiments of the present disclosure, a method of operating a terminal in a wireless communication system includes receiving a resource configuration information related to a resource for initial transmission and a resource for retransmission, transmitting initially-transmitted data through a first resource, and transmitting retransmitted data through a second resource, if a decoding of the initially-transmitted data fails at the base station. The second resource is determined based on the first resource and the resource configuration information.

According to various embodiments of the present disclosure, a base station apparatus in a wireless communication system includes a transceiver and at least one processor coupled to the transceiver. The transceiver transmits, to a terminal, a resource configuration information related to a resource for initial transmission and a resource for retransmission, and receives initially-transmitted data through a first resource, and receives retransmitted data through a second resource, if a decoding of the initially-transmitted data fails. The second resource is determined based on the first resource and the resource configuration information.

According to various embodiments of the present disclosure, a terminal apparatus in a wireless communication system includes a transceiver and at least one processor coupled to the transceiver. The transceiver receives a resource configuration information related to a resource for initial transmission and a resource for retransmission, and transmits initially-transmitted data through a first resource, and transmits retransmitted data through a second resource, when the decoding of the initially-transmitted data fails. The second resource is determined based on the first resource and the resource configuration information.

To solve the above problems, one embodiment of the present disclosure provides retransmitted data receiving method for non-orthogonal multiple access, comprising the following steps of:

determining resource configuration information and informing a transmitting device of the resource configuration information via a downlink channel;

receiving and decoding initially-transmitted data;

transmitting a retransmission indication signal when the decoding fails;

receiving retransmitted data, and determining initially-transmitted data corresponding to the retransmitted data according to the resource configuration information; and combining the retransmitted data and the initially-transmitted data to detect correct transmission data.

Optionally, the determining resource configuration information comprises one of the following:

dividing resources into groups to obtain a group corresponding to the initially-transmitted data and a group corresponding to the retransmitted data, and determining a mapping relation between the group corresponding to the initially-transmitted data and the group corresponding to the retransmitted data;

dividing resources into groups to obtain a group corresponding to the initially-transmitted data and a group corresponding to the retransmitted data, determining a mapping relation between the group corresponding to the initially-transmitted data and the group corresponding to the retransmitted data, and allocating resource information required for transmitting data to a user; and directly allocating resource information required for transmitting data for a user.

Specifically, the resources comprise DMRS resources and multiple access resources.

Optionally, the dividing resources into groups comprise at least one of the following:

dividing resources into two groups, with resources in both the two groups being DMRS resources for demodulation, and each group being respectively configured with one multiple access resource set or a multiple of groups being configured with a same multiple access set;

dividing resources into two groups, with resources in both the two groups being multiple access resources, and each group being respectively configured with one DMRS resource set or a multiple of groups being configured with a same DMRS resource set;

dividing resources into two groups, with one group being a DMRS resource group and the other group being multiple access resource group, and the multiple access resources in the multiple access resource set configured for the DMRS resource group being different from the multiple access resources in the multiple access resource group;

dividing resources into two groups, with one group being a DMRS resource group and the other group being multiple access resource group, and the DMRS resources in the DMRS resource set configured for the multiple access resource set being different from the DMRS resources in the DMRS resource group;

dividing resources into two groups, with resources in both the two groups being DMRS resources, and each DMRS resources in group being mapped to the configured multiple access resources by any one of one-to-one mapping, one-to-many mapping or many-to-one mapping;

dividing resources into two groups, with resources in both the two groups being multiple access resources, and each multiple access resources in group being mapped to the configured DMRS resources by any one of one-to-one mapping, one-to-many mapping or many-to-one mapping; and dividing resources into two groups, with one group being a DMRS resource group and the other group being multiple access resource group, each DMRS resource in the DMRS resource group being mapped to the configured multiple access resources by any one of one-to-one mapping, one-to-many mapping or many-to-one mapping, and each multiple access resource in the multiple access resource group being mapped to the configured DMRS resources by any one of one-to-one wrapping, one-to-many mapping or many-to-one mapping.

Optionally, when sources are divided into two groups and resources in the two groups are both DMRS resources, the multiple access resources respectively configured for the two groups of DMRS resources are the same or different; and/or, when sources are divided into two groups and resources in the two groups are both multiple access resources, the DMRS resources respectively configured for the two groups of multiple access resources are the same or different.

Specifically, the size of the multiple access resource set is represented by the number of available multiple access resources.

Optionally, the two groups of resources are mapped by any one of one-to-one mapping, one-to-many mapping or many-to-one mapping.

Further, the dividing resources into groups comprises: dividing resources at least into two groups, with the two adjacent groups of resources being mapped by any one of one-to-one mapping, one-to-many mapping or many-to-one mapping.

Specifically, the one-to-many mapping specifically means that, among two adjacent groups of resources, any one resource in the former group is mapped to a multiple of resources in the latter group; and/or, the many-to-one mapping mode specifically means that, among two adjacent groups of resources, a multiple of resources in the former group are mapped to one resource in the latter group; and/or, the one-to-one mapping mode specifically means that, among two adjacent groups of resources, any one resource in the former group is mapped to one resource in the latter group.

Optionally, the dividing resources into groups comprise at least one of the following:

dividing resources at least into two groups, with resources in each group being DMRS resources, and each group being respectively configured with one multiple access resource set or a multiple of groups being configured with a same multiple access set;

dividing resources at least into two groups, with resources in each group being DMRS resources, and the DMRS resources in each group being mapped to the configured multiple access resources;

dividing resources at least into two groups, with resources in each group being multiple access resources, and each group being respectively configured with one DMRS resource set or a multiple of groups being configured with a same DMRS resource set; and dividing resources at least into two groups, with resources in each group being multiple access resources, and the multiple access resources in each group being mapped to the configured DMRS resources.

Optionally, the mapping is any one of one-to-one mapping, one-to-many mapping or many-to-one mapping.

Further, the method also comprises: determining pairing information between the resource groups and different redundancy versions retransmitted by the system, wherein the resource groups and the different redundancy versions retransmitted by the system are paired in accordance with preset rules.

Specifically, the way of allocating, for a user, resource information required for transmitting data comprises static allocation, semi-static allocation and dynamic allocation.

Specifically, the way of allocating, for a user, resource information required for transmitting data is determined by the size of the network load.

Preferably, the resource groups are determined by the capability of the system in supporting how many terminals to access or the capability of the system in detecting the decoding performance gains.

Specifically, resources contained in each group are not repeated.

Another embodiment of the present disclosure provides a retransmitted data transmitting method for non-orthogonal multiple access, comprising the following steps of:

reading received resource configuration information;

transmitting initially-transmitted data based on the resource configuration information;

receiving a retransmission indication signal;

reading the resource configuration information, and determining resources for retransmission; and transmitting retransmitted data based on the determined resources for retransmission.

Further, the method also comprises a step of transmitting a resource update request to acquire new resource configuration information.

Specifically, the update request is transmitted based on the number of data retransmissions or current channel state information.

Optionally, the retransmitted data is transmitted in any one of the following ways to reduce the retransmission conflict probability: random backoff, the mapping mode between resource groups being as one-to-one mapping mode, system configuration of the retransmission time, employing preset rules for backoff, and a mechanism of backoff at fixed time.

Still another embodiment of the present disclosure provides a retransmitted data receiving device for non-orthogonal multiple access, comprising:

a resource configuration information determination unit configured to determine resource configuration information and inform a transmitting device of the resource configuration information via a downlink channel;

a first data receiving unit configured to receive and decode initially-transmitted data;

a retransmission indication unit configured to transmit a retransmission indication signal when the decoding fails;

a second data receiving unit configured to receive retransmitted data, and determine initially-transmitted data corresponding to the retransmitted data according to the resource configuration information; and a data combining unit configured to combine the retransmitted data and the initially-transmitted data to detect correct transmission data.

Yet another embodiment of the present disclosure provides a retransmitted data transmitting device for non-orthogonal multiple access, comprising:

a resource configuration information reading unit configured to read received resource configuration information;

a first data transmitting unit configured to transmit initially-transmitted data based on the resource configuration information;

a receiving unit configured to receive a retransmission indication signal;

a resource determination unit configured to read the resource configuration information, and determine resources for retransmission; and a second data transmitting unit configured to transmit retransmitted data based on the determined resources for retransmission.

Compared with the prior art, the solutions of the present disclosure have the following advantages.

The present disclosure provides a retransmitted data receiving method for non-orthogonal multiple access, and a corresponding transmitting method. A receiver determines resource configuration information required by a terminal, the resources comprising DMRS resources and multiple access resources, and an terminal transmits initially-transmitted data and retransmitted data on the resource configuration information. In this way, the receiver can distinguish the initially-transmitted data and the retransmitted data based on the resource configuration information used by the terminal, and further, can find corresponding initially-transmitted data according to the resources of the received retransmitted data and obtain correct transmitted data by combining the initially-transmitted data and the retransmitted data. The method of the present disclosure can avoid conflict occurring when the initially-transmitted data and the retransmitted data are transmitted, and further improve the probability of correctly decoding the transmission data while improving the retransmission performance.

An apparatus and method in accordance with various embodiments of the present disclosure is characterized in that the terminal transmits initially-transmitted data and retransmitted data according to the resource configuration information determined by the receiver, and the receiver distinguishes the initially-transmitted data and the retransmitted data based on the resource configuration information, so that a collision that occurs when the initial-transmitted data and the retransmitted data are transmitted can be avoided, and the probability of correctly decoding the transmission data while improving the retransmission performance can be improved.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

FIG. 1 illustrates a wireless communication system according to various embodiments of the present disclosure;

FIG. 2 illustrates a configuration of a base station in a wireless communication system according to various embodiments of the present disclosure;

FIG. 3 illustrates a configuration of a terminal in a wireless communication system according to various embodiments of the present disclosure;

FIG. 4 is an exemplary diagram of one-to-one mapping between a resource group for initial transmission and a resource group for retransmission in a wireless communication system according to various embodiments of the present disclosure;

FIG. 5 is an exemplary diagram of a retransmission flow in a wireless communication system according to various embodiments of the present disclosure;

FIG. 6 is a flow diagram of a retransmitted data receiving method for non-orthogonal multiple access in a wireless communication system according to various embodiments of the present disclosure;

FIG. 7 is a flow diagram of a retransmitted data transmitting method for non-orthogonal multiple access in a wireless communication system according to various embodiments of the present disclosure;

FIG. 8 is an exemplary diagram of one-to-one mapping between a demodulation reference signal (DMRS) resource group for initial transmission and a DMRS resource group for retransmission in a wireless communication system according to various embodiments of the present disclosure;

FIG. 9 is an exemplary diagram of a retransmission flow based on DMRS resource groups in a wireless communication system according to various embodiments of the present disclosure;

FIG. 10 is an exemplary diagram of a multiple access resource group for initial transmission and a multiple access resource group for retransmission in a wireless communication system according to various embodiments of the present disclosure;

FIG. 11 is an exemplary diagram of a retransmission flow based on multiple access resource groups in a wireless communication system according to various embodiments of the present disclosure;

FIG. 12A and FIG. 12B are exemplary diagrams of one-to-one mapping based on a DMRS resource group and a multiple access resource group in a wireless communication system according to various embodiments of the present disclosure;

FIG. 13 is an exemplary diagram of mapping based on DMRS resource groups, with DMRS resources and multiple access resources being mapped one-to-one in a wireless communication system according to various embodiments of the present disclosure;

FIG. 14 is an exemplary diagram of mapping based on DMRS resource groups, with DMRS resources and multiple access resources being mapped one-to-many in a wireless communication system according to various embodiments of the present disclosure;

FIG. 15 is an exemplary diagram of mapping based on DMRS resource groups, with DMRS resources and multiple access resources being mapped many-to-one in a wireless communication system according to various embodiments of the present disclosure;

FIG. 16 is an exemplary diagram of a transmission flow based on DMRS resource groups and on the mapping between DMRS resources and multiple access resources in a wireless communication system according to various embodiments of the present disclosure;

FIG. 17 is an exemplary diagram of a resource group for initial transmission and maximum M times resource groups for retransmission in a wireless communication system according to various embodiments of the present disclosure;

FIG. 18 is a schematic diagram of an order of the generated redundancy versions (RVs) and of the transmitted RVs in a wireless communication system according to various embodiments of the present disclosure;

FIG. 19 is an exemplary diagram of pairing between RV groups and resource groups in a wireless communication system according to various embodiments of the present disclosure;

FIGS. 20A and 20B are an exemplary diagram of mapping of resource groups and allocation of grouped resources on the network side in a wireless communication system according to various embodiments of the present disclosure;

FIG. 21 is an exemplary diagram of a flow of dynamically configuring grouped resources on the network side;

FIG. 22A is an exemplary diagram of a flow of asking for a resource update request by an terminal based on the number of retransmissions in a wireless communication system according to various embodiments of the present disclosure;

FIG. 22B is an exemplary diagram of a flow of asking for a resource update request by an terminal based on the channel state in a wireless communication system according to various embodiments of the present disclosure;

FIG. 23 is an exemplary diagram of one-to-many mapping between grouped resources in a wireless communication system according to various embodiments of the present disclosure;

FIG. 24 is an exemplary diagram of configuration of a backoff time by the system in a wireless communication system according to various embodiments of the present disclosure;

FIG. 25 is a structural block diagram of a retransmitted data receiving device for non-orthogonal multiple access in a wireless communication system according to various embodiments of the present disclosure; and FIG. 26 is a structural block diagram of a retransmitted data transmitting device for non-orthogonal multiple access in a wireless communication system according to various embodiments of the present disclosure.

SUMMARY

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meanings as those commonly understood by a person skilled in the art to which the present disclosure pertains. Such terms as those defined in a generally used dictionary may be interpreted as having the meanings equal to the contextual meanings in the relevant field of art, and are not to be interpreted as having ideal or excessively formal meanings unless clearly defined in the present disclosure. In some cases, even terms defined in the present disclosure should not be interpreted as excluding embodiments of the present disclosure.

Hereinafter, various embodiments of the present disclosure will be described from the perspective of hardware. However, various embodiments of the present disclosure include a technology that uses both hardware and software, and thus the various embodiments of the present disclosure may not exclude the perspective of software.

Hereinafter, the present disclosure relates to an apparatus and method for retransmission in a wireless communication system. Specifically, the terminal transmits initial-transmitted data and retransmitted data according to the resource configuration information determined by the receiver, and the receiver for receiving the initial-transmitted data and the retransmitted data based on the resource configuration information.

Terms used in the following descriptions, such as a term referring to variables that determine physical attributes configuring a frame, a term referring to a signal, a term referring to a channel, a term referring to control information, a term referring to network entities, and a term referring to an element of a device, are used for convenience of explanation. Accordingly, the present disclosure is not limited to the following terms, and other terms having an equivalent technical meaning may be used.

Further, the present disclosure describes various embodiments using terms used in some communication standards (e.g., 3rd Generation Partnership Project (3GPP)), but this merely corresponds to an example for explanation. Various embodiments of the present disclosure may be easily modified and applied to other communication systems as well.

FIG. 1 illustrates a wireless communication system according to various embodiments of the present disclosure. FIG. 1 illustrates a base station 110, a terminal 120, and a terminal 130, as a part of nodes using a wireless channel in a wireless communication system. FIG. 1 illustrates only one base station, but may further include another base station that is identical or similar to the base station 110.

The base station 110 is a network infrastructure that provides the terminals 120 and 130 with wireless access. The base station 110 has a coverage defined by a predetermined geographic area based on the distance over which a signal may be transmitted. The base station 110 may be referred to as an "access point (AP)", an "eNodeB (eNB)", a "5th generation node (5G node)", a "wireless point", a "transmission/reception point (TRP)", or other terms having an equivalent technical meaning.

Each of the terminal 120 and the terminal 130 is an apparatus used by a user, and performs communication with the base station 110 through a wireless channel. In some cases, at least one of the terminal 120 and the terminal 130 may be operated without user involvement. That is, at least one of the terminal 120 and the terminal 130 is an apparatus that performs machine-type communication (MTC), and may not be carried by a user. Each of the terminal 120 and the terminal 130 may be referred to as a "user equipment (UE)", a "mobile station", a "subscriber station", a "remote terminal", a "wireless terminal", a "user device", or other terms having an equivalent technical meaning.

The base station 110, the terminal 120, and the terminal 130 may transmit and receive a radio signal in a millimeter wave (mmWave) band (28 GHz, 30 GHz, 38 GHz, or 60 GHz). At this time, in order to improve a channel gain, the base station 110, the terminal 120, and the terminal 130 may perform beamforming. Here, the beamforming may include transmission beamforming and reception beamforming. That is, the base station 110, the terminal 120, and the terminal 130 may assign directivity to a transmission signal or a reception signal. To this end, the base station 110 and the terminals 120 and 130 may select serving beams 112, 113, 121, and 131 through a beam search or a beam management procedure. After the serving beams 112, 113, 121, and 131 are selected, subsequent communication may be performed through a resource in a quasi co-located (QCL) relationship with a resource for transmission of the serving beams 112, 113, 121, and 131.

FIG. 2 illustrates a configuration of a base station in a wireless communication system according to various embodiments of the present disclosure. The configuration illustrated in FIG. 2 may be understood as a configuration of the base station 110. The terms " . . . , unit", " . . . device", etc. used below refer to a unit for processing at least one function or operation, and may be implemented as hardware, software, or a combination of hardware and software.

Referring to FIG. 2, the base station may include a wireless communication unit 210, a backhaul communication unit 220, a storage unit 120, and a control unit 240.

The wireless communication unit 210 performs functions for transmitting or receiving a signal through a wireless channel. For example, the wireless communication unit 210 performs conversion between a baseband signal and a bit string according to the physical layer standard of the system. For example, when data is transmitted, the wireless communication unit 210 generates complex symbols by encoding and modulating a transmission bit string. Further, when data is received, the wireless communication unit 210 restores a reception bit string by demodulating and decoding a baseband signal. In addition, the wireless communication unit 210 up-converts a baseband signal to a radio frequency (RF) band signal, transmits the up-converted signal through an antenna, and down-converts an RF band signal received through the antenna to a baseband signal.

To this end, the wireless communication unit 210 may include a transmission filter, a reception filter, an amplifier, a mixer, an oscillator, a digital to analog converter (DAC), an analog to digital converter (ADC), and the like. In addition, the wireless communication unit 210 may include a plurality of transmission/reception paths. Further, the wireless communication unit 210 may include at least one antenna array including a plurality of antenna elements. In terms of hardware, the wireless communication unit 210 may include a digital unit and an analog unit, and the analog unit may include a plurality of sub-units according to an operation power, an operation frequency, and the like.

As described above, the wireless communication unit 210 transmits and receives a signal. Accordingly, all or a part of the wireless communication unit 210 may be referred to as a "transmission unit", a "reception unit", or a "transceiver". In addition, in the following description, the meaning of transmission and reception performed through a wireless channel includes performing of processing, such as that described above, by the wireless communication unit 210.

The backhaul communication unit 220 provides an interface for performing communication with other nodes within a network. That is, the backhaul communication unit 220 converts a bit string transmitted from the base station to another node, for example, another access node, another base station, an upper node, a core network, etc., into a physical signal, and converts a physical signal received from another node into a bit string.

The storage unit 230 stores data, such as a basic program for operation of the base station, an application program, and configuration information. The storage unit 230 may include a volatile memory, a nonvolatile memory, or a combination of a volatile memory and a nonvolatile memory. Further, the storage unit 230 provides stored data in response to a request from the control unit 240.

The control unit 240 controls the overall operation of the base station. For example, the control unit 240 transmits and receives a signal through the wireless communication unit 210 or through the backhaul communication unit 220. In addition, the control unit 240 records data in the storage unit 230 and reads the data. Further, the control unit 240 may perform functions of a protocol stack required by the communication standard. To this end, the control unit 240 may include at least one processor.

According to various embodiments, The control unit 240 determines the resource configuration information and informs the end of data transmission of the resource configuration information by the downlink channel. For example, the control unit 240 can receive the initial-transmitted data and, if decoding fails, control to transmit a retransmission instruction signal. At this time, the control unit 240 can receives the retransmitted data, determines the initial-transmitted data corresponding to the retransmitted data according to the resource configuration information, and combines the retransmitted data and the initial-transmitted data in order to accurately detect the transmitted data. For example, the control unit 240 may control the base station to perform operations according to various embodiments described below.

FIG. 3 illustrates a configuration of a terminal in a wireless communication system according to various embodiments of the present disclosure. The configuration illustrated in FIG. 3 may be understood as a configuration of the terminal 120. The terms " . . . unit", " . . . device", etc. used below refer to a unit for processing at least one function or operation, and may be implemented as hardware, software, or a combination of hardware and software.

Referring to FIG. 3, the terminal includes a communication unit 310, a storage unit 320, and a control unit 330.

The communication unit 310 performs functions for transmitting or receiving a signal through a wireless channel. For example, the communication unit 310 performs conversion between a baseband signal and a bit string according to the physical layer standard of the system. For example, when data is transmitted, the communication unit 310 generates complex symbols by encoding and modulating a transmission bit string. Further, when data is received, the communication unit 310 restores a reception bit string by demodulating and decoding a baseband signal. In addition, the communication unit 310 up-converts a baseband signal to an RF band signal, transmits the up-converted signal through an antenna, and down-converts an RF band signal received through the antenna to a baseband signal. For example, the communication unit 310 may include a transmission filter, a reception filter, an amplifier, a mixer, an oscillator, a DAC, an ADC, and the like.

In addition, the communication unit 310 may include a plurality of transmission/reception paths. Further, the communication unit 310 may include at least one antenna array including a plurality of antenna elements. In terms of hardware, the communication unit 310 may include a digital circuit and an analog circuit (e.g., a radio frequency integrated circuit (RFIC)). Here, the digital circuit and the analog circuit may be implemented as a single package. In addition, the communication unit 310 may include a plurality of RF chains. Furthermore, the communication unit 310 may perform beamforming.

As described above, the communication unit 310 transmits and receives a signal. Accordingly, all or a part of the communication unit 310 may be referred to as a "transmission unit", a "reception unit", or a "transceiver". In addition, in the following description, the meaning of transmission and reception performed through a wireless channel includes performing of processing, such as that described above, by the communication unit 310.

The storage unit 320 stores data, such as a basic program for operation of the terminal, an application program, and configuration information. The storage unit 320 may include a volatile memory, a nonvolatile memory, or a combination of a volatile memory and a nonvolatile memory. Further, the storage unit 320 provides stored data in response to a request from the control unit 330.

The control unit 330 controls the overall operation of the terminal. For example, the control unit 330 transmits and receives a signal through the communication unit 310. In addition, the control unit 330 records data in the storage unit 320 and reads the data. Further, the control unit 330 may perform functions of a protocol stack required by the communication standard. To this end, the control unit 330 may include at least one processor or a microprocessor, or may be part of a processor. Further, the control unit 330 and a part of the communication unit 310 may be referred to as a communication processor (CP).

According to various embodiments, the control unit 330 can control to read the received resource configuration information and transmit the initial-transmitted data based on the resource configuration information. At this time, When receiving the retransmission instruction signal, the control unit 330 can control to read resource configuration information, determine resources for retransmission, and transmit retransmitted data based on the resources for the determined retransmission. For example, the control unit 330 may control the terminal to perform operations according to various embodiments described below.

The rapid development of information industry, particularly the increasing demand from the mobile Internet and the Internet of Things (IoT), brings about unprecedented challenges in the future mobile communications technology. For example, according to the ITU-R M. [IMT.BEYOND 2020: TRAFFIC] issued by the International Telecommunication Union (ITU), it can be expected that, by 2020, mobile service traffic will grow nearly 1,000 times as compared with that in 2010 (4G era), and the number of terminals connections will also be over 17 billion, and with a vast number of IoT equipments gradually expand into the mobile communication network, the number of connected equipments will be even more astonishing. In response to this unprecedented challenge, the communications industry and academia have prepared for 2020s by launching an extensive study of the fifth generation of mobile communications technology (5G). Currently, in ITU-R M. [IMT.VISION] from ITU, the framework and overall objectives of 5G in the future have been discussed, where the demands outlook, application scenarios and various important performance indexes of 5G have been described in detail. In terms of new demands in 5G, the ITU-R M. [IMT.FUTURE TECHNOLOGY TRENDS] from ITU provides information related to the 5G technology trends, which is intended to address prominent issues such as significant improvement on system throughput, consistency of the user experience, scalability so as to support IoT, delay, energy efficiency, cost, network flexibility, support for new services and flexible spectrum utilization, etc.

For more diverse business scenarios of 5G the flexible multiple access technology is required to support various scenarios and business requirements. For example, for a business scenario with massive connections, how to allow more terminals to access in limited resources becomes a core problem to be solved in the 5G multiple access technology. In the present 4G LTE network, the Orthogonal Frequency Division Multiplexing (OFDM) based multiple access technologies are mainly employed. However, obviously, the existing access mode based on orthogonality cannot meet the requirements of 5G in improving the spectrum efficiency by 5 to 15 times and having millions of terminals accessed per square kilometer. The Non-orthogonal Multiple Access (NMA) technology can greatly increase the connection number of supported terminals since it shares the same resources to a multiple of terminals. Since there are more opportunities for terminals to access, the overall throughput of network and the spectrum efficiency are improved. In addition, for the massive Machine Type Communication (mMTC) scenario, considering the cost of the terminal and the complexity in implementation, it may need use more simply operated multiple access technologies. For business scenarios requiring low delay or low power consumption, the use of the non-orthogonal multiple access technology can better achieve scheduling-free and contention-based access and further low-delay communication, and can shorten the startup time and reduce the power consumption of the equipment. When a contention-based access mode is used, the multiple access resources used by the terminals may collide. When terminals need to perform retransmission, the selection of the multiple access resources and the DMRS resources may lead to more conflicts, thereby influencing the performance of transmission. Therefore, a suitable retransmission mechanism is needed to solve this performance degradation problem.

The currently major non-orthogonal multiple access technologies in research are, Multiple User Shared Access (MUSA), Non-Orthogonal Multiple Access NOMA), Pattern Division Multiple Access (PUMA), Sparse Code Multiple Access (SCMA) and Interleave Division Multiple Access (IDMA) etc. Wherein, for MUSA, terminals are distinguished by code words; for SCMA, terminals are distinguished via a codebook; for NOMA, terminals are distinguished by power; for PDMA, terminals are distinguished by different feature patterns; and for IDMA, different terminals are distinguished by interleaved sequences.

When the existing non-orthogonal multiple access modes (SCMA, etc.) are applied to contention-based transmission, no matter terminals randomly select the multiple access resources and the DMRS resources or the network side semi-statically configures the multiple access resources and the DMRS resources, conflict may occur, leading to transmission failure. Meanwhile, poor channel quality may also lead to transmission failure. In this case, the terminals will receive a feedback from the network side, and will then perform retransmission. However, the existing contention-based non-orthogonal multiple access modes do not propose any specific processing method for retransmission. If the multiple access resources are selected in a similar way to the initial transmission, the network side will be unable to distinguish the data is newly-transmitted data or retransmitted data. The function of retransmission cannot be realized, and much interference will be caused to the newly-transmitted data.

The DMRS resources may include at least one sequence used as demodulation reference signal. The multiple access resource may include at least one physical resource or at least one signature for a multiple access. For example, the at least one physical resource may be defined in the form of a time-frequency resource and the at least one signature may be defined in the form of at least one of a codebook, a codeword, a sequence, a interleaver, a mapping pattern, a demodulation reference signal, a preamble, a spatial-dimension, a power-dimension and so on.

The DMRS resource may be used for a reference signal for channel estimation then eventually for data demodulation. In a embodiment, the DMRS resource may contain a pool including a certain number of DMRS sequences, and the pool may be divided into groups. Various multiple access resources may be used based on a certain multiple access schemes to distinguish the different users. For example, in interleave-grid multiple access (IGMA), the multiple access resource could be the bit-level interleaves, and/or mapping patterns. For another example, in SCMA, the multiple access resource could be the codebooks.

So for grant free transmission, the DMRS resources and the multiple access resources may be divided onto groups in which each contains certain number of DMRS resources and multiple access resources. A base station may configure to terminals with the groups, and the terminals may select the resources to process and transmit data.

In the frame/subframe, DMRS sequences based on the DMRS resource may be insert among data symbols. The multiple access sequence may be used to processing the data (e.g., using the interleaver to interleave the coded bits).

The present disclosure proposes a retransmission method in contention-based (scheduling-free) or grant-free transmission. No matter in initial transmission or retransmission, an terminal needs to use at least one DMRS resource and at least one multiple access resource to process and transmit data. In a scheduling-free transmission mode, the terminal can select the DMRS resource and the multiple access resource autonomously, or select a time to transmit data autonomously. Although scheduling-free transmission can reduce the signaling overheads of the system and the non-orthogonal multiple access mode allows a multiple of terminals to share a same time-frequency resource, data from different terminals may still conflict to result in transmission failure. In this case, retransmission is required. If, during the retransmission, the terminal still selects the LAIRS resource and the multiple access resource autonomously, or selects the time to transmit data autonomously, it is unable for the network side to distinguish the initially-transmitted data and the retransmitted data, and thus unable to realize the transmission effect. Therefore, in the present disclosure, the network side will divide resources (e.g., multiple access resources or DMRS resources) used by the terminal into two groups, and there will be $N_1$ resources for newly-transmitted (i.e., initially-transmitted) data in the first group and $N_2$ resources for retransmitted data in the second group. Meanwhile, the two groups of resources are mapped. That is, one resource in the first group can be mapped to one or more resources in the second group, or a multiple of resources in the first group can also be mapped to one resource in the second group.

FIG. 4 is an exemplary diagram of one-to-one mapping between a resource group for initial transmission and a resource group for retransmission in a wireless communication system according to various embodiments of the present disclosure. FIG. 4 illustrates a one-to-one mapping between a resource group (first group of resources) 410 for initial transmission and a resource group (second group of resources) 420 for retransmission. That is, one resource in the first group 410 is mapped to one resource in the second group 420, and in this case, $N_1=N_2$. The network side informs the terminal of the configured resource group information via a downlink channel (e.g., a physical broadcast channel (PBCH), a physical downlink shared channel (PDSCH), or a physical downlink control channel (PDCCH), etc.).

In a case where the terminal employs a non-orthogonal multiple access and contention-based transmission mode, for the initial transmission, the terminal selects one resource $A_1$, $A_1 \in \{1,2,3,\ldots,N_1\}$, from the first group of resources 410 for data transmission, and if the initial transmission fails, the terminal performs retransmission after receiving a retransmission indication (e.g., an negative-acknowledge (NACK) message) from the network. The terminal finds the second group of resources $A_2$ 420, $A_2 \in \{1,2,3,\ldots,N_2\}$, to which the resource $A_1$ is mapped, in accordance with the resource $A_1$ selected for initial transmission, and then uses $A_2$ to transmit the retransmitted data.

The terminal uses a random backoff mechanism when transmitting the retransmitted data. That is, the time interval between the transmitting of the retransmitted data and the transmitting of the initially-transmitted data is random. This can reduce the conflict probability of the retransmitted data between different terminals. For example, data from terminal$_A$ and data from terminal$_B$ collide and are thus not decoded correctly because the terminal$_A$ and terminal$_B$ select same resources (same DMRS resources or multiple access resources) during the initial transmission, and the two terminals both detect an NACK signal for retransmission. In this case, since resources in the resource group for initial transmission and in the resource group for retransmission are mapped to each other, for example, in a way of one-to-one mapping, the two terminals will select the same resources for retransmission. As a result, conflict occurs again, leading to high possibility of demodulation failure. With the use of the random backoff mechanism, upon receiving an NACK signal, the terminal selects to transmit the retransmitted signal again after a certain period of time, and even if terminal$_A$ and terminal$_B$ still select the same resources (same DMRS resources or multiple access resources) to transmit the retransmitted data, the probability of demodulation failure resulted from the collision and conflict of the retransmitted data is reduced due to the stagger time.

On the network side, a base station regards data detected by the first group of resources as newly-transmitted data and data detected by the second group of resources as retransmitted data. When the retransmitted data is detected, the first group of resources possibly used for the initially-transmitted data can be derived reversely by the used second group of resources. Thus, the possible initially-transmitted data can be found. Signals of the two transmissions can be combined and processed jointly to improve the detection performance and realize the purpose of retransmission. It is to be noted that, when signals are processed jointly, because of the randomness in selection of resources by the terminal, the network side may need to combine the received retransmitted signals and a multiple initially-transmitted signals, respectively, to eventually detect the correct signals. An exemplary diagram of a retransmission flow according to the present disclosure is illustrated in FIG. 5.

FIG. 5 is an illustration of an example of a retransmission flow in a wireless communication system according to various embodiments of the present disclosure. Referring to FIG. 5, the base station 110 performs configuration resources grouping in step 501, and then informs the terminal 120 of this information in step 503. When the terminal 120 needs to transmit data, it reads the resource group information in step 505, selects a resource $A_1$ for initial transmission to transmit data in step 507, and then transmits data in step 509, if the initial transmission fails and the retransmission of data is required, the base station 110 transmits a NACK in step 511 and informs the terminal 120 that the data is not correctly decoded in step 513. The terminal 120 receives NACK in step 515 and finds a resource $A_2$ possibly used for retransmission according to the mapping relation among the resource groups to transmit the retransmitted data, until the maximum number of retransmissions is exceeded or information indicating that the data is correctly demodulated is received in step 517. In addition, the terminal 120 performs a random backoff in step 519, finds a second group $A_2$ of resources in step 521, and retransmits the data in step 523. The base station 110 receives the retransmitted data in step 525, finds the initially-transmitted data, and merges the retransmitted data and the initially-transmitted data for detection. In addition, the base station 110 informs the user of an ACK if the decoding is successful in step 527, and informs the terminal 120 that the data is correctly decoded in step 529. The terminal 120 receives the ACK in step 531.

Based on the above-mentioned fundamental principle, as illustrated in FIG. 6, an embodiment of the present disclosure provides a retransmitted data receiving method for non-orthogonal multiple access. FIG. 6 illustrates a flow diagram for retransmitted data receiving for non-orthogonal multiple access in a wireless communication system according to various embodiments of the present disclosure. FIG. 6 illustrates a method of operation of a receiving device for receiving data. The receiving device may be referred to as a data receiver. In the case of uplink communication, the receiving device may be a base station (e.g., base station 110).

Referring to FIG. 6, in step 601, the receiving device determines resource configuration information and informs a transmitting device of the resource configuration information via a downlink channel. The receiving device receives and decodes initially-transmitted data in step 603. The receiving device transmits a retransmission indication signal when the decoding fails in step 605. Herein, the retransmission indication signal is a signal to be transmitted when decoding failure of the initial-transmitted data is received. In particular, the transmitting device is notified of the failed decoding by the transmission of the NACK signal, and the transmitting device performs retransmission of the data. The receiving device receives retransmitted data, and determines the initially-transmitted data corresponding to the retransmitted data according to the resource configuration information in step 607. The receiving device combines the retransmitted data and the initially-transmitted data to detect correct transmission data.

Wherein, there are specifically various methods for determining resource configuration information: first, dividing resources into groups to obtain a group corresponding to the initially-transmitted data and a group corresponding to the retransmitted data, and determining a mapping relation between the group corresponding to the initially-transmitted data and the group corresponding to the retransmitted data, second, dividing resources into groups to obtain a group corresponding to the initially-transmitted data and a group corresponding to the retransmitted data, determining a mapping relation between the group corresponding to the initially-transmitted data and the group corresponding to the retransmitted data, and allocating, for a user, resource information required for transmitting data, or directly allocating, for a user, required resource information may be used.

In various embodiments, the resources comprise DMRS resources and multiple access resources.

The determining resource configuration information comprises the following. The receiving device divides resources into groups, and determines a mapping relation between the group corresponding to the initially-transmitted data and the group corresponding to the retransmitted data.

Optionally, the dividing resources into groups comprise at least one of the following. According to one embodiment, the receiving device divides resources into two groups, with resources in both the two groups being DMRS resources, and each group being respectively configured with one multiple access resource set or a multiple of groups being configured with a same multiple access resource set. According to other embodiment, the receiving device divides resources into two groups, with resources in both the two groups being multiple access resources, and each group being respectively configured with one DMRS resource set or a multiple of groups being configured with a same DMRS resource set. According to other embodiment, the receiving device divides resources into two groups, with one group being a DMRS resource group and the other group being multiple access resource group, and the multiple access resources in the multiple access resource set configured for the DMRS resource group being different from the multiple access resources in the multiple access resource group. According to other embodiment, the receiving device divides resources into two groups, with one group being a DMRS resource group and the other group being multiple access resource group, and the DMRS resources in the DMRS resource set configured for the multiple access resource group being different from the DMRS resources in the DMRS resource group. According to other embodiment, the receiving device divides resources into two groups, with resources in both the two groups being DMRS resources, and DMRS resources in each group being mapped to the configured multiple access resources by any one of one-to-one mapping, one-to-many mapping or many-to-one mapping. According to other embodiment, the receiving device divides resources into two groups, with resources in both the two groups being multiple access resources, and multiple access resources in each group being mapped to the configured DMRS resources by any one of one-to-one mapping, one-to-many mapping or many-to-one mapping. According to other embodiment, the receiving device divides resources into two groups, with one group being a DMRS resource group and the other group being multiple access resource group, each DMRS resources in the DMRS resource group being mapped to the configured multiple access resources by any one of one-to-one mapping, one-to-many mapping or many-to-one mapping, and each multiple access resources in the multiple access resource group being mapped to the configured DMRS resources by any one of one-to-one mapping, one-to-many mapping or many-to-one mapping.

Further, when sources are divided into two groups and resources in the two groups are both DMRS resources, the multiple access resources respectively configured for the two groups of DMRS resources are the same or different. When sources are divided into two groups and resources in the two groups are both multiple access resources, the DMRS resources respectively configured for the two groups of multiple access resources are the same or different.

In various embodiments, the size of the multiple access resource set can be represented by the number of available multiple access resources.

Further, the dividing resources into groups comprises dividing resources at least into two groups, with the two adjacent groups of resources being mapped by any one of one-to-one mapping, one-to-many mapping or many-to-one mapping, Wherein, the one-to-many mapping specifically means that, among two adjacent groups of resources, any one resource in the former group is mapped to a multiple of resources in the latter group. The many-to-one mapping mode specifically means that, among two adjacent groups of resources, a multiple of resources in the former group are mapped to one resource in the latter group. The one-to-one mapping mode specifically means that, among two adjacent groups of resources, any one resource in the former group is mapped to one resource in the latter group.

Optionally, in a case where resources are divided at least into two groups, the dividing resources into groups comprise at least one of the following. According to one embodiment, the receiving device divides resources at least into two groups, with resources in each group being DMRS resources, and each group being respectively configured with one multiple access resource set or a multiple of groups being configured with a same multiple access set. According to other embodiment, the receiving device divides resources at least into two groups, with resources in each group being DMRS resources, and the DMRS resources in each group being mapped to the configured multiple access resources. According to other embodiment, the receiving device divides resources at least into two groups, with resources in each group being multiple access resources, and each group being respectively configured with one DMRS resource set or a multiple of groups being configured with a same DMRS resource set. According to other embodiment, the receiving device divides resources at least into two groups, with resources in each group being multiple access resources, and the multiple access resources in each group being mapped to the configured DMRS resources. Wherein, the mapping mode is any one of one-to-one mapping, one-to-many mapping or many-to-one mapping.

According to various embodiments, the method further comprises: determining pairing information between the resource groups and different redundancy versions retransmitted by the system, wherein the resource groups and the different redundancy versions retransmitted by the system are paired in accordance with preset rules.

According to various embodiments, the way of allocating, for a user, resource information required for transmitting data comprises static allocation, semi-static allocation d dynamic allocation.

According to various embodiments, the way of allocating, for a user, resource information required for transmitting data is determined by the size of the network load.

According to various embodiments, the resource groups are determined by the capability of the system in supporting how many terminals to access or the capability of the system in detecting the decoding performance gains.

According to various embodiments, resources contained in each group are not repeated.

FIG. 7 is a flow diagram of a retransmitted data transmitting method for non-orthogonal multiple access in a wireless communication system according to various embodiments of the present disclosure. FIG. 7 illustrates a method of operating a transmitting device that transmits data. The transmitting device may be referred to as a data transmitter. In the case of uplink communication, the transmitting device may be a terminal (e.g., terminal 120 or terminal 130).

Referring to FIG. 7, the transmitting device reads received resource configuration information in step 701. The transmitting device transmits initially-transmitted data based on the resource configuration information in step 703. The transmitting device receives a retransmission indication signal in step 705. The transmitting device reads the resource configuration information, and determines resources for retransmission in step 707. The transmitting device transmits retransmitted data based on the determined resources for retransmission in step 709.

The read resource configuration information is configured via a receiving device in advance, and informed via a downlink channel, so that a transmitting device can read the resource configuration information and use the respective resource configuration information to transmit the initially-transmitted data.

When the transmitting device receives a retransmission indication signal, step 707 is performed reading the accomplished resource configuration information determined by the receiving device in advance, the resource configuration information comprising resource group information and the mapping relation between the groups or being DMRS resources or multiple access resources allocated for a user, and determining the resources for retransmission based on the resource configuration information.

Wherein, the resource group information and the mapping relation can be configured by the receiving device in advance and transmitted to the transmitting device, and a resource update request can also be transmitted by the transmitting device to the receiver to acquire new resource configuration information in real time. Specifically, the update request is transmitted based on the number of data retransmissions or the current channel state information.

Further, during e transmitting of the retransmitted data, the retransmitted data can be transmitted in any one of the following ways to reduce the retransmission conflict probability. According to various embodiments, the retransmitted data may be transmitted based on one of random backoff, the mapping mode between resource groups being as one-to-one mapping mode, system configuration of the retransmission time, employing preset rules for backoff, and a mechanism of backoff at fixed time.

To further explain the embodiments of the methods as described above, various embodiments are described below.

Embodiment 1

In this embodiment, description will be given to how the retransmission mode (i.e., a retransmission mode in which two groups of resources are both DMRS resources) in the present disclosure works, based on mapping between DMRS resource groups. The network side will divide reference signals (i.e., DMRS) for data demodulation into two groups, and there will be $N_1$ DMRSresources for newly-transmitted data in the first group and $N_2$ DMRSresources for retransmitted data in the second group. Meanwhile, the two groups of resources are mapped. That is, one DMRS in the first group can be mapped to one or more DMRSs in the second group, or a multiple of DMRSs in the first group can also be mapped to one DMRS in the second group.

FIG. 8 is an exemplary diagram of one-to-one mapping between a demodulation reference signal (DMRS) resource group for initial transmission and a DMRS resource group for retransmission in a wireless communication system according to various embodiments of the present disclosure. FIG. 8 illustrates a one-to-one mapping between a DMRS resource group (a first group of DMRS resources) 810 for initial transmission and a DMRS resource group (a second group of DMRS resources) 820 for retransmission. That is, one DMRS in the first group 810 is mapped to one DMRS in the second group 820, different DMRS resource in the first group 810 is mapped to different DMRS resource in the second group 820, and in this case, $N_1=N_2$. Whereas, for multiple access resources (e.g., codebooks in SCMA, codeword matrixes in PDMA, spread spectrum sequences in MUSA, interleaved sequences in IDMA, interleaved sequences and grid mapping patterns in IGMA, etc.), the network side will configure a multiple access resource pool for contention-based transmission. The size of the multiple access resource pool is NMA which indicates that there are NMA available multiple access resources in the resource pool. It is to be noted that each group can be configured with a respective multiple access resource pool or a multiple of groups can be configured with a same multiple access resource pool.

A terminal, employing contention-based transmission, selects one multiple access resource from the multiple access resource pool to process and transmit data. The network side informs the terminal of the configured DMRS resource group information, mapping relation between groups, and information about the multiple access resource pool via a downlink channel (e.g., a physical broadcast channel, a physical downlink shared channel, or a physical downlink control channel, etc.).

In a case where the terminal employs a non-orthogonal multiple access and contention-based transmission mode, for the initial transmission, the terminal selects one DMRS from the first group of DMRS resources, represented as D1, $D_1 \in \{1,2,3, \ldots, N_1\}$, and selects one multiple access resource from the multiple access resource pool, represented as $MA_1$, $MA_1 \in \{1,2,3, \ldots, N_{MA}\}$, to process and transmit the data. If the initial transmission fails, the terminal performs retransmission after receiving a retransmission indication (e.g., an NACK message) from the network. The terminal finds the second group of DMRS resources $D_2$, $D_2 \in \{1,2,3, \ldots, N_2\}$, to which the DMRS resource $D_1$ is mapped, in accordance with the DMRS resource $D_1$ selected for initial transmission, and randomly selects one multiple access resource $MA_2$, $MA_2 \in \{1,2,3, \ldots, N_{MA}\}$, from the multiple access resource pool, to process and transmit the retransmitted data.

The terminal uses a random backoff mechanism when transmitting the retransmitted data. That is, the time interval between the transmitting of the retransmitted data and the transmitting of the initially-transmitted data is random. This can reduce the conflict probability of the retransmitted data between different terminals. For example, data from terminal$_A$ and data from terminal$_B$ collide and are thus not decoded correctly because terminal$_A$ and terminal$_B$ select same resources during the initial transmission, and the two terminals detect an NACK signal for retransmission. In this case, since DMRS resources in the resource group for initial transmission and in the resource group for retransmission are mapped to each other, for example, in a way of one-to-one mapping, the two terminals will select the same DMRS resources for retransmission. As a result, conflict occurs again, leading to high possibility of demodulation failure. With the use of the random backoff mechanism, upon receiving an NACK signal, the terminal selects to transmit the retransmitted signal again after a certain period of time, and even if terminal$_A$ and terminal$_B$ still select the same resources to transmit the retransmitted data, the probability of demodulation failure resulted from the collision and conflict of the retransmitted data on the DMRSs is reduced due to the stagger time.

On the network side, a base station regards data detected by the first group of DMRS resources as newly-transmitted data and data detected by the second group of DMRS resources as retransmitted data. When the retransmitted data is detected, the first group of DMRS resources possibly used for the initially-transmitted data can be derived reversely by the used second group of DMRS resources. Thus, the possible initially-transmitted data can be found. Signals of the two transmissions can be combined and processed jointly to improve the detection performance and realize the purpose of retransmission. It is to be noted that, when signals are processed jointly, the received retransmitted signals and a multiple of initially-transmitted signals need to be combined, respectively, to eventually detect the correct signals. An exemplary diagram of a retransmission flow based on DMRS resource groups in this embodiment is illustrated in FIG. 9.

FIG. 9 is an illustration of a retransmission flow based on DMRS resource groups in a wireless communication system according to various embodiments of the present disclosure. Referring to FIG. 9, the base station 110 performs mapping of the DMRS resource groups and the configuration of the multiple access resource pool in step 901, and then informs the terminal 120 of the configuration information in step 903. When the terminal 120 needs to transmit data, it reads the resource group information in step 905, then selects a DMRS resource $D_1$ for initial transmission, and randomly selects a multiple access resource $MA_1$ to process in step 907, and transmits the data in the 909. If the initial transmission fails and the retransmission of the data is required, the base station 110 transmits a NACK in step 911 and informs the terminal 120 that the data is not correctly decoded in step 913. The terminal 120 receives NACK in step 915 and finds a DMRS resource $D_2$ possibly used for retransmission according to the mapping relation among the DMRS resource groups, and the randomly selected multiple access resource $MA_2$ to transmit the retransmitted data, until the data is correctly demodulated or the maximum number of retransmissions is exceeded in step 917. In addition, the terminal 120 performs a random backoff in step 919, finds a second group resources $D_2$ and $MA_2$ in step 921, and retransmits the data in step 923. The base station 110 receives the retransmitted data in step 925, finds the initially-transmitted data, and merges the retransmitted data and the initially-transmitted data for detection. In addition, the base station 110 informs the user of an ACK if the decoding is successful in step 927, and informs the terminal 120 that the data is correctly decoded in step 929. The terminal 120 receives the ACK in step 931.

Embodiment 2

In this embodiment, description will be given to how the retransmission mode (i.e., a retransmission mode in which two groups of resources are both multiple access resources) in the present disclosure works, based on mapping between multiple access resource groups. The network side will divide multiple access resources into two groups, wherein the multiple access resources are resources for distinguishing terminals, for example, codebook resources in SCAM, codeword resources in PDMA, complex spreading sequence resources in MUSA, spreading sequence resources in CDMA, interleaved sequence resources in IDMA, interleaved sequences and grid mapping patterns in IGMA, etc. There are $N_1$ multiple access resources for newly-transmitted data in the first group and $N_2$ multiple access resources for retransmitted data in the second group. Meanwhile, the two groups of resources are mapped. That is, one multiple access resource in the first group can be mapped to one or more multiple access resources in the second group, or a multiple of multiple access resources in the first group can also be mapped to one multiple access resource in the second group.

FIG. 10 is an exemplary diagram of a multiple access resource group for initial transmission and a multiple access resource group for retransmission in a wireless communication system according to various embodiments of the present disclosure. FIG. 10 is a exemplary diagram of one-to-one mapping. That is, one multiple access resource in the different first group 1010 is mapped to one multiple access resource in the different second group 1020, and in this case, $N_1=N_2$. Whereas, for DMRS resources, the network side will configure a DMRS resource pool for contention-based transmission. The size of the DMRS resource pool is $N_D$ which indicates that there are $N_D$ available DMRS resources in the resource pool. It is to be noted that each group can be configured with a respective DMRS resource pool or a multiple of groups can be configured with a same DMRS resource pool. An terminal, employing contention-based transmission, randomly selects one DMRS resource from the DMRS resource pool for transmission. The network side informs the terminal of the configured multiple access resource group information, mapping relation between groups, and information about the DMRS resource pool via a downlink channel (e.g., a physical broadcast channel, a physical downlink shared channel, or a physical downlink control channel, etc.

In a case where the terminal employs a non-orthogonal multiple access and contention-based transmission mode, for the initial transmission, the terminal selects one multiple access resource from the first group of multiple access resources, represented as $MA_1$, $MA_1 \in \{1,2,3,\ldots,N_1\}$, and selects one DMRS from the DMRS resource pool, represented by $D_1$, $D_1 \in \{1,2,3,\ldots,N_D\}$, for channel estimation when the network side receives the initially-transmitted data. If the initial transmission fails, the terminal performs retransmission after receiving a retransmission indication (e.g., an NACK message) from the network. The terminal finds the second group of multiple access resources $MA_2$, $MA_2 \in \{1,2,3,\ldots,N_2\}$, to which the multiple access resource $MA_1$ is mapped, in accordance with the multiple access resource $MA_1$ selected for initial transmission, and randomly selects one LAIRS resource $D_2$, $D_2 \in \{1,2,3,\ldots,N_D\}$, from the DMRS resource pool, for channel estimation when the retransmitted data is received.

The terminal uses a random backoff mechanism when transmitting the retransmitted data, in order to reduce the conflict probability of the retransmitted data between different terminals. That is, the time interval between the transmitting of the retransmitted data and the transmitting of the initially-transmitted data is random. For example, data from terminal$_A$ and data from terminal$_B$ collide and are thus not demodulated correctly because terminal$_A$ and terminal$_B$ select same resources during the initial transmission, and the two terminals detect an NACK signal for retransmission. In this case, since there is a mapping relation between the multiple access resources in the resource group for initial transmission and in the resource group for retransmission, for example, one-to-one mapping, the two terminals will select the same multiple access resources for retransmission. As a result, conflict occurs again, leading to high possibility of retransmission failure. With the use of the random backoff mechanism, upon receiving an NACK signal, the terminal randomly selects to transmit the retransmitted signal again after a certain period of time, and even if terminal$_A$ and terminal$_B$ still select the same multiple access resources to transmit the retransmitted data, the probability of demodulation failure resulted from the collision and conflict of the retransmitted data on the multiple access resources is reduced due to the stagger time.

On the network side, a base station regards data detected by the first group of multiple access resources as newly-transmitted data and data detected by the second group of multiple access resources as retransmitted data. When the retransmitted data is detected, the first group of multiple access resources possibly used for the initially-transmitted data can be derived reversely by the used second group of multiple access resources. Thus, the possible initially-transmitted data can be found. Signals of the two transmissions can be combined and processed jointly to improve the detection performance and realize the purpose of retransmission. It is to be noted that, when signals are processed jointly, because of the randomness in selection of resources by the terminal, the received retransmitted signals and a multiple of initially-transmitted signals need to be combined, respectively, to eventually detect the correct signals. An exemplary diagram of a retransmission flow based on multiple access resource groups in this embodiment is illustrated in FIG. 11.

FIG. 11 is an exemplary diagram of a retransmission flow based on multiple access resource groups in a wireless communication system according to various embodiments of the present disclosure. Referring to FIG. 11, the base station 110 performs mapping of the multiple access resource groups and the configuration of the DMRS resource pool in step 1101, and then informs the terminal 120 of the configuration information in step 1103. When the terminal 120 needs to transmit data, it reads the resource group information in step 1105, then selects a multiple access resource $MA_1$ for initial transmission, and randomly selects a DMRS resource $D_1$ to process in step 1107, and transmits the data in step 1109. If the initial transmission fails and the retransmission of the data is required, the base station 110 transmits a NACK in step 1111 and informs the terminal 120 that the data is not correctly decoded in step 1113. The terminal 120 receives NACK in step 1115 and finds a multiple access resource $MA_2$ used for retransmission according to the mapping relation among the multiple access resource groups, and the randomly selected DMRS resource $D_2$ to transmit the retransmitted data, until the data is correctly demodulated or the maximum number of retransmissions is exceeded in step 1117. In addition, the terminal 120 performs a random backoff in step 1119, finds a second group resources $MA_2$ and $D_2$ in step 1121, and retransmits the data in step 1123. The base station 110 receives the retransmitted data in step 1125, finds the initially-transmitted data, and merges the retransmitted data and the initially-transmitted data for detection. In addition, the base station 110 informs the user of an ACK if the decoding is successful in step 1127, and informs the terminal 120 that the data is correctly decoded in step 1129. The terminal 120 receives the ACK in step 1131.

Embodiment 3

In the foregoing two embodiments, the retransmission is realized by the group mapping between two groups of same resources. In this embodiment, the completion of transmission by association mapping between mixed groups of different resources will be described. That is, resources in the two resource groups are different resources. Resources in one group are DMRS resources, and resources in the other group are multiple access resources. Resources in the two groups are mapped to each other.

FIG. 12A and FIG. 12B are exemplary diagrams of one-to-one mapping based on a DMRS resource group and a multiple access resource group in a wireless communication system according to various embodiments of the present disclosure.

Referring to FIG. 12A, resources in the first group 1210 are DMRS resources, and resources in the second group 1220 are multiple access resources. And, resources in the first group 1210 can be mapped to resources in the second group 1220 in a way of one-to-many mapping, many-to-one mapping or one-to-one mapping, as illustrated in FIG. 12A.

Referring to FIG. 12B, resources in the first group 1230 are multiple access resources, and resources in the second group 1240 are DMRS resources. And, resources in the first group 1230 can be mapped to resources in the second group 1240 in a way of one-to-many mapping, many-to-one mapping or one-to-one mapping, as illustrated in FIG. 12B.

In addition, if resources in a resource group are DMRS resources (i.e., a DMRS resource group), the network side will configure a multiple access resource pool, and multiple access resources in the resource pool should be different from resources in other multiple access resource groups. Similarly, if resources in a resource group are multiple access resources (i.e., a multiple access resource group), the network side will configure a DMRS resource pool, and DMRS resources in the resource pool should be different from resources in other DMRS resource groups. The network side informs the terminal of the configuration information of mapping between resource groups, the configuration information of the resource pool, and the mapping relation between groups via a downlink channel (e.g., a physical broadcast channel, a physical downlink shared channel, or a physical downlink control channel, etc.).

In a case where the terminal employs a non-orthogonal multiple access and contention-based transmission mode, for the initial transmission, the terminal selects one resource from the first group of resources, and if the initial transmission fails, the terminal performs retransmission after receiving a retransmission indication (e.g., an NACK message) from the network. The terminal reads the configuration information of mapping between resource groups, finds the second group of resources, to which the resource is mapped, in accordance with the resource selected for initial transmission, and uses the second group of resources to transmit the retransmitted data.

On the network side, a base station regards data detected by the first group of resources as newly-transmitted data and data detected by the second group of resources as retransmitted data. When the retransmitted data is detected, the first group of resources possibly used for the initially-transmitted data can be derived reversely by the used second group of resources. Thus, the possible initially-transmitted data can be found. Signals of the two transmissions can be combined and processed jointly to improve the detection performance and realize the purpose of retransmission. It is to be noted that, when signals are processed jointly, because of the randomness in selection of resources by the terminal, the received retransmitted signals and a multiple of initially-transmitted signals may need to be combined, respectively, to eventually detect the correct signals or the maximum number of retransmissions is exceeded.

Embodiment 4 in the foregoing embodiments, the retransmission modes based on mapping between DMRS resource groups, based on mapping between multiple access resource groups, and based on mapping between a DMRS resource group and a multiple access resource mixed group have been described, respectively. Wherein, for any transmission (initial transmission or retransmission), the DMRS resources and the multiple access resources used by the terminal are configured independently. For example, during group mapping based on DMRS resource, the multiple access resources used for transmission are configured into a resource pool, for the purpose of completely randomly selection by the terminal. And, during mapping based on multiple access resource groups, the DMRS resources used for transmission are configured into a resource pool, for the purpose of completely randomly selection by the terminal. In this way, the network side is required to, when detecting data, for resources in each resource group, blindly detect resources in all possible resource pools, and, for each possible combination of DMRS resources and multiple access resources, transmit an indication (ACK/NACK) indicating whether the transmission is successful. For example, for a retransmission mode based on mapping between DMRS resource groups, corresponding to the detection of the initially-transmitted data, ($N_1$*NMA) ACK/NACK indications need to be transmitted. In this embodiment, the retransmission mode in the present disclosure will be described, by using the mapping relation between the DMRS resources and the multiple access resources during one transmission. That is, after resource groups are configured, the multiple access resources configured for the DMRS resource group are configured in the mapping relation instead of being configured into a multiple access resource pool as described in the foregoing embodiments. And similarly, the DMRS resources configured for the multiple access resource group are configured in the mapping relation instead of being configured into a DMRS resource pool as described in the foregoing embodiments. The specific description will be given below.

If resources in a resource group are DMRS resources, when the resources in this group are selected for transmission, DMRS resources and multiple access resources can be mapped as follows.

According to one embodiment, DMRS resources and multiple access resources are mapped one-to-one. In this case, when an terminal selects one DMRS resource $D_{1-1}$, it also correspondingly selects a multiple access resource $MA_{1-1}$ corresponding to $D_{1-1}$; and when the network side performs signal detection, if the network side detects $D_{1-1}$, it can demodulate the data by using the multiple access resource $MA_{1-1}$ corresponding to $D_{1-1}$, without detecting each possible multiple access resource, and also without transmitting a correspondingly ACK/NACK for all possible combinations of DMRS resources and multiple access resources. When the initially-transmitted data is not detected and when the terminal retransmits the data upon receiving an NACK signal, it can find the second group of DMRS resources $D_{2-1}$, to which $D_{1-1}$ is mapped, in accordance with $D_{1-1}$, and the multiple access resource $MA_{2-1}$, to which $D_{2-1}$ is mapped, to transmit the data.

FIG. 13 is an exemplary diagram mapping based on DMRS resource groups, with DMRS resources and multiple access resources being mapped one-to-one in a wireless communication system according to various embodiments of the present disclosure. Referring to FIG. 13, in the mapping based on the DMRS resource groups, the first group of DMRS resources and the second group of DMRS resources are also mapped one-to-one. Wherein, the first group of DMRS resources 1310 and the second group of DMRS resources 1320 can also be mapped one-to-many or many-to-one, and in this case, $N_1 \neq N_2$. The multiple access resources 1330 and 1340, to which the two groups of DMRS resources 1310 and 1320 are mapped, can be the same or different.

According to other embodiment, DIMS resources and multiple access resources are mapped one-to-many. In this case, during the initial transmission of data, when an terminal selects one DMRS resource $D_{1-1}$, it then selects one multiple access resource from $NMA_{1-1}$ multiple access resources to which $D_{1-1}$ is mapped; and when the network side performs signal detection, if the network side detects the signal of $D_{1-1}$, it can demodulate the data by using the possible $NMA_{1-1}$ multiple access resources corresponding to $D_{1-1}$, without blindly detecting all available multiple access resources. The network side needs to blindly detect all available multiple access resources only when $NMA_{1-1}$ is equal to the number of all available multiple access resources. Similarly, during the retransmission of data, the terminal finds $D_{2-1}$ in the possible second group of DMRS resources, in accordance with $D_{1-1}$ used for initial transmission, and selects one multiple access resource from $NMA_{2-1}$ multiple access resources to which $D_{2-1}$ is mapped, to process and transmit the data. The network side can find possible used multiple access resources by the detected DMRS resources, and possible first group of DMRS resources.

FIG. 14 is an exemplary diagram of mapping based on DMRS resource groups, with DMRS resources and multiple access resources being mapped one-to-many in a wireless communication system according to various embodiments of the present disclosure. Referring to FIG. 14, in the mapping based on the DMRS resource groups, DMRS resources and multiple access resources are mapped one-to-many. Meanwhile, the first group of DMRS resources 1410 and the second group of DMRS resources 1420 can also be mapped one-to-one. Wherein, the first group of DMRS resources 1410 and the second group of OARS resources 1420 can also be mapped one-to-many or many-to-one, and in this case, $N_1 \neq N_2$. In addition, the multiple access resources corresponding to the DMRS resources in a same group can be different, and the number of multiple access resources can be different, that is, $NMA_{1-1} \neq NMA_1 - N_1$. The multiple access resources 1430, 1440 and 1450 corresponding to the DMRS resources in different groups 1410 and 1420 can be different; and the number of multiple access resources can be different; that is, $NMA_{1-1} \neq NMA_{2-1}$. The multiple access resources 1430, 1440 and 1450, to which the two groups of DMRS resources 1410 and 1420 are mapped, can be the same or different.

According to other embodiment, DMRS resources and multiple access resources are mapped many-to-one. In this case, during the initial transmission of data, when an terminal selects one DMRS resource it transmits the data from the multiple access resource $MA_{1-1}$ corresponding to $D_{1-1}$. Differing from the above two situations, there may be a multiple of DMRS resources (e.g., $D_{1-1}$ and $D_{1-2}$) mapped to $MA_{1-1}$. When other terminals select $D_{1-2}$, they may also use the multiple access resource $MA_{1-1}$ to process and transmit data. When the network side performs signal detection, if the network side detects $D_{1-1}$ and $D_{1-2}$, it will perform signal detection on a same multiple access resource $MA_{1-1}$ respectively by using channels estimated by $D_{1-1}$ and $D_{1-2}$, and in this case, two estimated values of the signal will be obtained. Similarly, during the retransmission of data, the terminal finds $D_{2-1}$ in the possible second group of DMRS resources in accordance with $D_{1-1}$ used for initial transmission, and processes and transmits the data from the multiple access resource $MA_{2-1}$ to which $D_{2-1}$ is mapped. The network side can find the multiple access resource $MA_{2-1}$ used by the terminal by the detected DMRS resource $D_{2-1}$, and possible used first group of DMRS resources.

FIG. 15 is an exemplary diagram of mapping based on DMRS resource groups, with DMRS resources and multiple access resources being mapped many-to-one in a wireless communication system according to various embodiments of the present disclosure. Referring to FIG. 15, in the mapping based on the DMRS resource groups, the DMRS resources and the multiple access resources are mapped many-to-one. Wherein, the first group of DMRS resources 1510 and the second group of DMRS resources 1520 can also be mapped one-to-many or many-to-one, and in this case, $N_1 \neq N_2$. In addition, a multiple of DMRS resources in a same group can be mapped to a same multiple access resource. The multiple access resources 1530 and 1540, to which the two groups of DMRS resources 1510 and 1520 are mapped, can be the same or different.

In the foregoing three embodiments, the two groups of DMRS resources are mapped to multiple access resources in a same way. There can be following ways of mapping the two groups of DMRS resources.

According to one embodiment, the first group of DMRS resources are mapped to the multiple access resources one-to-one, and the second group of DMRS resources are mapped to the multiple access resources one-to-many or many-to-one. According to other embodiment, the first group of DMRS resources are mapped to the multiple access resources one-to-many, and the second group of DMRS resources are mapped to the multiple access resources one-to-one or many-to-one. According to other embodiment, the first group of DMRS resources are mapped to the multiple access resources many-to-one, and the second group of DMRS resources are mapped to the multiple access resources one-to-many or one-to-one.

The specific mapping implementations have been explained in the foregoing descriptions of the three methods, and will not be repeated here. In addition, the two groups of DMRS resources can be mapped to each other one-to-one, one-to-many or many-to-one.

If resources in a resource group are multiple access resources, when the resources in this group are selected for transmission, the retransmission mode is similar to the retransmission mode based on DMRS resource groups. The difference lies in that the network side will perform grouping on resources first; and then the terminal will select one multiple access resource, and select one DMRS resource, to which the selected multiple access resource is mapped, or select one from a multiple of DMRS resources, to process and transmit data. There are following specific mapping modes.

According to one embodiment, the first group of multiple access resources are mapped to the DMRS resources one-to-one, and the second group of multiple access resources are mapped to the DMRS resources one-to-one, one-to-many or many-to-one. According to other embodiment, the first group of multiple access resources are mapped to the DMRS resources one-to-many, and the second group of multiple access resources are mapped to the DMRS resources one-to-one, one-to-many or many-to-one. According to other embodiment, the first group of multiple access resources are mapped to the DMRS resources many-to-one, and the second group of multiple access resources are mapped to the DMRS resources one-to-one, one-to-many or many-to-one.

The specific mapping implementations have been explained in the foregoing descriptions of the three methods, and will not be repeated here. In addition, the two groups of multiple access resources can be mapped to each other one-to-one, one-to-many or many-to-one.

If resource groups are mixed groups, for example, resources in one group are DMRS resources while resources in the other group are multiple access sources, the retransmission mode is similar to the above-mentioned retransmission mode based on DMRS resource groups or multiple access resource groups. There are following specific mapping ways.

According to one embodiment, the first group of DMRS resources are mapped to the multiple access resources one-to-one, one-to-many or many-to-one, and the second group of multiple access resources are mapped to the DMRS resources one-to-one, one-to-many or many-to-one. The first group of DMRS resources can be mapped to the second group of multiple access resources one-to-one, one-to-many or many-to-one; and it is to be noted that the multiple access resources used when the first group of DMRS resources are selected for transmission should be different from the multiple access resources in the second group.

According to other embodiment, the first group of multiple access resources are mapped to the DMRS resources one-to-one, one-to-many or many-to-one, and the second group of DMRS resources are mapped to the multiple access resources one-to-one, one-to-many or many-to-one. The first group of multiple access resources can be mapped to the second group of DMRS resources one-to-one, one-to-many or many-to-one; and it is to be noted that the DMRS resources used when the first group of multiple access resources are selected for transmission should be different from the DMRS resources in the second group.

After completing the configuration of mapping based on DMRS resource groups or the configuration of mapping based on multiple access resource groups or the configuration of mapping based on mixed groups, and also the mapping mode between each DMRS resource (or multiple access resource) group and the multiple access resources (or DMRS resources) required by this group for transmission, the network side informs the terminal of those configuration information via a downlink channel (e.g., a physical broadcast channel, a physical downlink shared channel, or a physical downlink control channel, etc.).

The terminal uses a random backoff mechanism when transmitting the retransmitted data, in order to reduce the conflict probability of the retransmitted data between different terminals. That is, the time interval between the transmitting of the retransmitted data and the transmitting of the initially-transmitted data is random. For example, in a retransmission mode in which mapping based on DMRS resource groups, data from $terminal_A$ and data from $terminal_B$ collide and are thus not decoded correctly because the $terminal_A$ and $terminal_B$ select same DMRS resources during the initial transmission, and the two terminals detect an NACK signal for retransmission. In this case, since there is a mapping relation between the DMRS resources used for initial transmission and retransmission, the two terminals may select the same DMRS resources for retransmission. As a result, conflict occurs again, leading to high possibility of retransmission failure. With the use of the random backoff mechanism, upon receiving an NACK signal, the terminal selects to transmit the retransmitted signal again after a certain period of time. And even if $terminal_A$ and $terminal_B$ still select the same DMRS resources to transmit the retransmitted data, the probability of the collision and conflict of the retransmitted data on the DMRSs is reduced due to the stagger time.

On the network side, a base station regards data detected by the first group of (DMRS/multiple access) resources as newly-transmitted data and data detected by the second group of (DMRS/multiple access) resources as retransmitted data. When the retransmitted data is detected, the first group of (DMRS/multiple access) resources possibly used for the initially-transmitted data can be derived reversely by the used second group of (DMRS/multiple access) resources. Thus, the possible initially-transmitted data can be found. Signals of the two transmissions can be combined and processed jointly to improve the detection performance and realize the purpose of retransmission. It is to be noted that, when signals are processed jointly, because of the randomness in selection of resources by the terminal, the received retransmitted signals and a multiple of possible initially-transmitted signals need to be combined, respectively, to eventually detect the correct signals. An exemplary diagram of a retransmission flow based on DMRS resource groups and mapping between the DMRS resources and multiple access resources is illustrated in FIG. 16.

FIG. 16 is an exemplary diagram of a transmission flow based on DMRS resource groups and on the mapping between DMRS resources and multiple access resources in a wireless communication system according to various embodiments of the present disclosure. Referring to FIG. 11, the base station 110 configures the grouping mode of DMRS resources and the mapping mode between the DMRS resources and the multiple access resources in step 1601, and then informs the terminal 120 of the configuration information in step 1603. When the terminal 120 needs to transmit data, it reads the resource group information in step 1605, and then selects a DMRS resource $D_1$ for initial transmission and a multiple access resource $MA_1$, to which $D_1$ is mapped, to process in step 1607, and transmits the data in step 1609. If the initial transmission fails and the retransmission of the data is required, the base station 110 transmits a NACK in step 1611 and informs the terminal 120 that the data is not correctly decoded in step 1613. The terminal 120 receives NACK in step 1615 and finds a DMRS resource $D_2$ need to be used for retransmission according to the mapping relation among the DMRS resource groups, and the multiple access resource $MA_2$ to which $D_2$ is mapped, to transmit the retransmitted data, until the data is correctly demodulated in step 1617. In addition, the terminal 120 performs a random backoff in step 1619, finds a second group resources $D_2$, and $MA_2$ in step 1621, and retransmits the data in step 1623. The base station 110 receives the retransmitted data in step 1625, finds the initially-transmitted data, and merges the retransmitted data and the initially-transmitted data for detection. In addition, the base station 110 informs the user of an ACK if the decoding is successful in step 1627, and informs the terminal 120 that the data is correctly decoded in step 1629. The terminal 120 receives the ACK in step 1631. The retransmission mode based on mapping between multiple access resource groups or based on mapping between mixed groups of resources can use the similar operations.

Embodiment 5

In the foregoing embodiments, the retransmission mode in which there are two groups has been described. In this embodiment, how the retransmission mode in which there are more than two groups (i.e., a retransmission mode in which the number of resources groups is greater than 2) will be described.

If the maximum number of retransmissions supported by an terminal is M(M>0), the network side divides resources (DMRS resources or multiple access resources) into M+1 groups, including one resource group for initial transmission (i.e., the first group of resources) and M resource groups for retransmission.

FIG. 17 is an exemplary diagram of a resource group for initial transmission and maximum M times resource groups for retransmission in a wireless communication system according to various embodiments of the present disclosure. FIG. 17 illustrates a resource group 1710 for initial transmission and a maximum of M resource groups 1720-1 to 1720-M for retransmission. Referring to FIG. 17, the resources in two adjacent groups are mapped one-to-one. In addition, one-to-many mapping or many-to-one mapping can also be used Here, one-to-many mapping mode means that one resource in the $m^{th}(1 \le m \le M)$ group 1720-*m* can be mapped to a multiple of resources in the $(m+1)^{th}(2 \le m+1 \le M+1)$ group 1720-(*m*+1); and many-to-one mapping mode means that a multiple of resources in the $m^{th}(1 \le m \le M)$ group 1720-*m* can be mapped to one resource in the $(m+1)^{th}(2 \le m+1 \le M+1)$ group 1720-(*m*+1). If resources in a resource group are DMRS resources, when the resources in this group are selected for transmission, the receiver on the network side can configure the used multiple access resources into a resource pool, or configure a mapping relation between the DMRS resources in the resource group and the used multiple access resources. Similarly, if resources in a resource group are multiple access resources, when the resources in this group are selected for transmission, the network side can configure the used DMRS resources into a resource pool, or configure a mapping relation between the multiple access resources in the resource group and the used DMRS resources. After completing the configuration operation, the network side informs the terminal of the configuration information via a downlink channel (e.g., a physical broadcast channel, a physical downlink shared channel, or a physical downlink control channel, etc.).

In a case where the terminal employs a non-orthogonal multiple access and contention-based transmission mode, for the initial transmission, the terminal selects one resource, represented by $A_1$, $\in \{1,2,3, \ldots, N_1\}$, from the resource group for initial transmission (the first group of resources). If $A_1$ is a DMRS resource, the terminal selects one multiple access resource from the configured multiple access resource pool, or selects one multiple access resource from the multiple access resources to which $A_1$ is mapped, to process and transmit data. Similarly, if $A_1$ is a multiple access resource, the terminal selects one DMRS resource from the configured DMRS resource pool, or selects one DMRS resource from the DMRS resources to which $A_1$ is mapped, to process and transmit data. Similarly, if $A_2$ is a multiple access resource, the terminal selects one DMRS resource from the configured DMRS resource pool, or selects one DMRS resource from the DMRS resources to which $A_2$ is mapped, to process and transmit data. If the initial transmission fails, the terminal performs retransmission after receiving a retransmission indication (e.g., an NACK message) from the network. The terminal finds the resource group for first retransmission (the second group of resources) $A_2(A_2 \in \{1,2,3 \ldots, N_2\})$ 1720-1, to which the resource $A_1$ is mapped, in accordance with the resource $A_1$ selected for initial transmission. If $A_2$ is a DMRS resource, the terminal selects one multiple access resource from the configured multiple access resource pool, or selects one multiple access resource from the multiple access resources to which $A_2$ is mapped, to process and transmit data. If the first retransmission still fails, the terminal performs second retransmission after receiving a retransmission indication (e.g., an NACK message) from the network. The terminal finds the resource group for second retransmission (the third group of resources) $A_3(A_3 \in \{1,2,3 \ldots, N_3\})$ 1720-2, to which the resource $A_2$ is mapped, in accordance with the resource $A_2$ selected for first retransmission. The remaining operations are similar to the first retransmission. The process is repeated until the data from the terminal is correctly demodulated, or the number of retransmissions reaches the maximum threshold M.

FIG. 18 is a schematic diagram of an order of the generated redundancy versions (RVs) and of the transmitted RVs in a wireless communication system according to various embodiments of the present disclosure. Referring to FIG. 18, when the retransmission mode of the system transmits different redundancy versions (RV), similarly to the setup in LTE, that is, different RVs(e.g., $RV_0$, $RV_1$, $RV_2$, $RV_3$) are generated at the channel coding stage and the order of RVs transmitted 1820 may be different from the order of RVs generated 1810. The redundancy version 0 (i.e., $RV_0$) is transmitted in the initial transmission, the redundancy version 2 (i.e., $RV_2$) is transmitted in the first retransmission, the redundancy version 3 (i.e., $RV_3$) is transmitted in the second retransmission, the redundancy version(i.e., $RV_1$) is transmitted in the third retransmission. Obviously, the order of the transmitted versions is not consistent.

In the retransmission mode according to various embodiments, the transmitted RVs can be paired with the resource groups. If there are M+1 RVs, resources are divided into 7 groups so that the RVs are paired with the resource groups one-to-one. The pairing rule is that the RVs are paired with the configured resource groups successively according to the order of the transmitted RVs. The network side can determine the pairing information between the resource groups and the RVs in advance and keep this pairing information unchanged, or it can inform the terminal of the pairing information together with the resource group configuration information. If there are four RVs for transmission (including initial transmission and retransmission), that is, the maximum number of retransmissions is 3, M=3, and the order of the transmitted RVs is $RV_0$, $RV_2$, $RV_3$, $RV_1$, the pair between RV groups and resource groups can be configured as illustrated in FIG. 19.

FIG. 19 is an exemplary diagram of pairing between RV groups and resource groups in a wireless communication system according to various embodiments of the present disclosure. $RV_0$ is designated to the resource group 1910 for initial transmission, $RV_2$ is designated to the resource group 1920 for first retransmission, $RV_3$ is designated to the resource group 1930 for second retransmission, and $RV_1$ is designated to the resource group 1940 for third retransmission, as illustrated in FIG. 19. This pairing mode has the following advantages: when the terminal is transmitting data, the network side can determine whether the data is newly-transmitted data or retransmitted data from the resources used by the terminal, and can also determine that the retransmitted data is the RV number used by the terminal. This is beneficial for detection and decoding on the network side.

The terminal uses a random backoff mechanism when transmitting the retransmitted data, in order to reduce the conflict probability of the retransmitted data between different terminals. That is, the time interval between the transmitting of the retransmitted data and the transmitting of the initially-transmitted data is random. For example, data from $terminal_A$ and data from $terminal_B$ collide and are thus not demodulated correctly because the two terminals select same resources during the initial transmission, and the $terminal_A$ and $terminal_B$ detect an NACK signal for retransmission. In this case, since there is a mapping relation between the multiple access resources in the resource group for initial transmission and in the resource group for retransmission, for example, one-to-one mapping, the two terminals will select the same multiple access resources for retransmission. As a result, conflict occurs again, leading to high possibility of retransmission failure. With the use of the random backoff mechanism, upon receiving an NACK signal, the terminal selects to transmit the retransmitted signal again after a certain period of time. And even if $terminal_A$ and $terminal_B$ still select the same multiple access resources to transmit the retransmitted data, the probability of the collision and conflict of the retransmitted data on the multiple access resources is reduced due to the stagger time.

On the network side, a base station regards data detected by the first group of multiple access resources as newly-transmitted data and data detected by the second group of multiple access resources as data retransmitted for the first time. When the retransmitted data is detected, the first group of resources possibly used for the initially-transmitted data can be derived reversely by the used second group of resources. Thus, the possible initially-transmitted data can be found. Signals of the two transmissions can be combined and can be processed jointly to improve the detection performance and realize the purpose of retransmission. It is to be noted that, when signals are processed jointly, because of the randomness in selection of resources by the terminal, the received retransmitted signals and a multiple of initially-transmitted signals need to be combined, respectively. When the data retransmitted for the first time is not detected and when the terminal detects a retransmission indication (NACK signal), the terminal selects one resource from the third group of resources for second retransmission. The remaining operations are similar. The process is repeated until the data is correctly decoded, or the number of retransmissions reaches the maximum threshold.

Embodiment 6

In the foregoing embodiments, the way of realizing scheduling-free transmission is that the network side first completes the configuration of grouped resources and then transmits the configuration information to the terminal, and the terminal itself randomly selects one resource from the grouped resources to process and transmit data. In this embodiment, a retransmission method in another scheduling-free transmission implementation will be described. That is, the way of allocating resources for a user by the network side includes: the network side first completes the grouping and determines a mapping relation between the groups, and then allocates resources for the user; or, the network side directly allocates the desired resources for the user without performing grouping.

FIGS. 20A and 20B are an exemplary diagram of mapping of resource groups and allocation of grouped resources on the network side in a wireless communication system according to various embodiments of the present disclosure. In an example as illustrated in FIGS. 20A and 20B, the base station 110 configures the grouping and mapping of resources in step 2001, and then allocates the grouped resources in steps 2003 and 2005. That is, the terminals 120 and 130 are allocated with corresponding DMRS resources and multiple access resources, and then read resource allocations in steps 2007 and 2009. In the case of correct demodulation without collision, each of the terminals 120 and 130 transmits data by the uplink channel in steps 2013 and 2015, and the base station 110 transmits an correct demodulation indication (e.g., ACK) in steps 2017 and 2019. This way has the following characteristics. The time for the terminal to transmit data is random, and therefore, although resources allocated to different terminals may be the same, data from the terminals to which same resources (DMRS resources and multiple access resources) are allocated may still be correctly demodulated because the time to transmit data is varied. And, data from the terminals will conflict only when same resources (DMRS resources and multiple access resources) are allocated to the terminals and the terminals select a same time to transmit the data. When the demodulation fails because of the collision of the data transmissions, the network side transmits a demodulation failure indication, and the terminals randomly select a next time to transmit the retransmitted data according to the random backoff mechanism.

As illustrated in FIGS. 20A and 20B, if a failure occurs because of a collision in the initial transmission and demodulation succeeds in retransmission, when data transmission of $terminal_1$ 120 in step 2023 and data transmission of $terminal_2$ 130 in step 2025 collide, the base station 110 transmits an incorrect demodulation indication (e.g., NACK) in steps 2027 and 2029. The $terminal_1$ 120 retransmits the data in step 2035 after time $T_1$ by performing the random backoff in step 2031. The $terminal_2$ retransmits the data in step 2037 after time $T_2$ by performing the random backoff in step 2033, and $T_1 > T_2$. In this case, the base station 110 transmits a correct demodulation indication (e.g., ACK) in steps 2039 and 2041, the time for the two terminals 120 and 130 to transmit the retransmitted data is staggered, thereby avoiding another demodulation failure because of collision.

There can be following ways of allocating grouped resources to the terminal by the network side.

First, static allocation. That is, after an terminal accesses to the network, DMRS resources and multiple access resources are statically allocated to the terminal and this is kept unchanged in the future.

Second, semi-static allocation. That is, after DMRS resources and multiple access resources are allocated to the terminal, this is kept unchanged within a period of time, and after a period of time, new DMRS resources and multiple access resources will be allocated to the terminal.

Third, dynamic allocation. That is, new MRS resources and multiple access resources will be allocated to the terminal for each transmission (including initial transmission and retransmission) or resources allocated each time include a resource group for initial transmission and a resource group for retransmission, and after the data is correctly demodulated or the maximum number of retransmissions is reached, the network side allocates new resources. An example of this flow is illustrated in FIG. 21.

FIG. 21 is an exemplary diagram of a flow of dynamically configuring grouped resources on the network side. Referring to FIG. 21, the base station 110 configures mapping between resource groups and the resource allocation in step 2101, and then informs the terminal 120 of the result of the resource allocation via a downlink channel in step 2103. When the terminal 120 needs to transmit data, it reads the resource allocation in step 2105, and then use the allocated resources for initial transmission to process in step 2107, and transmits the data in step 2109. If the decoding fails, the base station 110 transmits a NACK in step 2111 and informs the terminal 120 that the data is not correctly decoded in step 2113. The terminal 120 receives NACK in step 2115 and reads resource allocation, and use the allocated resources for retransmission to process data in step 2117. In addition, the terminal 120 performs a random backoff in step 2119, and retransmits the data in step 2121. The base station 110 receives the retransmitted data in step 2123, finds the initially-transmitted data, and merges the retransmitted data and the initially-transmitted data for detection. In addition, the base station 110 informs the user of an ACK if the decoding is successful in step 2125, and informs the terminal 120 that the data is correctly decoded in step 2127. The terminal 120 receives the ACK in step 2129.

By dynamic allocation, more accurate resource groups can be obtained in accordance with the situation of the network and the terminal. However, the signaling overheads are higher, and especially when there is a large quantity of terminals, the signaling overhead will become a very serious problem. By static allocation, there can be lower signaling overheads. However, the result of grouping is fixed, and no response can be made to the change in state of the network. The network side can decide which allocation way is to be used according to the network load. If the network load is less than a threshold $TH_1$, the allocation way is set as dynamic allocation. If the network load is greater than the threshold $TH_1$ and less than or equal to a threshold $TH_2$ ($TH_2 > TH_1$), the allocation way is set as semi-static allocation; and if the network load is greater than the threshold $TH_2$, the allocation way is set as static allocation.

In addition, the terminal can acquire new resource allocation by actively transmitting a resource update request. In one situation, when the number of retransmissions of the terminal reaches a preset threshold $TH_m$, the terminal determines that it needs better DMRS resources or multiple access resources, and in this case, it actively initiates a updated resource allocation request to the network side, for example, in IGMA, grid mapping patterns with higher use density (lower code rate, i.e., greater coding gain), or grid mapping patterns with lower grid mapping pattern density (i.e., greater power gain). The network side allocates new grouped networks to the terminal by receiving the request from the terminal. The terminal processes and transmits the data by using the new grouped resources, after reading the new grouped resources. The above-described procedure is described with reference to FIG. 22A.

FIG. 22A is an exemplary diagram of a flow of asking for a resource update request by an terminal based on the number of retransmissions in a wireless communication system according to various embodiments of the present disclosure. Referring to FIG. 22A, the terminal 120 determines that the number of retransmissions exceeds the threshold value in step 2201, and transmits an updated resource allocation request in step 2203. The base station 110 receives the updated resource allocation request in step 2205, and informs the terminal 120 of the result of the new resource allocation by a downlink channel in steps 2207 and 2209. The terminal 120 reads new resource allocation in step 2211, and use the newly-allocated resources to process data in step 2213. The terminal 120 performs the random backoff in step 2215, and transmits the data in step 2217. If the decoding successes, the base station 110 transmits ACK in step 2219.

In another situation, the terminal 120 determines that it needs better DMRS resources or multiple access resources by measuring the channel state information, for example, when the channel state is poor, and it actively initiates an updated resource allocation request to the network side, for example, in IGMA, grid mapping patterns with higher use density (lower code rate, i.e., greater coding gain), or grid mapping patterns with lower grid mapping pattern density (i.e., greater power gain). The base station 110 allocates new grouped networks for the terminal 120 by receiving the request from the terminal 102. The terminal 120 processes and transmits the data by using the new grouped resources, after reading the new grouped resources. The above-described procedure is described with reference to FIG. 22B.

FIG. 22B is an exemplary diagram of a flow of asking for a resource update request by an terminal based on the channel state in a wireless communication system according to various embodiments of the present disclosure. Referring to FIG. 22B, the terminal 120 measures the channel state information in step 2221, and transmits an updated resource allocation request and feed back the channel state information in step 2223. The base station 110 receives the updated resource allocation request and read the channel feedback information in step 2225, and updates the resource allocation and informs the user of the updated resource allocation by a downlink channel in steps 2227 and 2229. The terminal 120 reads new resource allocation in step 2231, and use the newly-allocated resources to process data in step 2233. The terminal 120 performs the random backoff in step 2235, and transmits the data in step 2237. If the decoding successes, the base station 110 transmits ACK in step 2239.

The procedure of FIG. 22B is similar to the procedure of FIG. 22A. The difference lies in that the reason of triggering the terminal to transmit an updated resource allocation request s the channel state information, and while transmitting the request, the terminal 120 needs to feed back the channel state information to the network side to assist the network side in making a decision.

Embodiment 7

In the foregoing embodiments, the basis for dividing resources into groups is that the two groups of resources should be different, and then the adjacent resource groups are mapped and the network side can be aware of whether the data is initially-transmitted data or data retransmitted for which time and the RV number, merely by distinguishing which group the used resources belong to. In this embodiment, in addition to the basis that the two groups of resources should be different, the basis for dividing resources into groups depends upon the property of the resources to be grouped, for example, there are few DMRS resources, however, the accurate channel measurement is advantageous to the detection and decoding on the network side or the length of the DMRS resources is larger, and the channel estimation is more accurate. For example, some of the multiple access resources support lower code rate (i.e., greater coding gain) or lower density (i.e., greater power gain), and some of the multiple access resources support more choices. For example, in SCMA, in a case where one RE is selected from four REs for transmission (the density is 0.25), four different codebook resources can be generated. In this case, the power gain is highest and the coding gain is lowest, but only four terminals can be supported. In a case where two REs are selected from four REs for transmission (the density is 0.5), six different codebook resources can be generated. In this case, the power gain is moderate and the coding gain is moderate, but six terminals can be supported. In a case where three REs are selected from four REs for transmission (the density is 0.75), four different codebook resources can be generated. In this case, the power gain is low and the coding gain is high, but only four terminals can be supported. Resources, having more accurate channel estimation information or having higher coding gain or higher power gain, can enable the data from the terminal to be successfully demodulated more easily. Whereas, some resources can enable the system to support more terminals to access, but the performance gain (e.g., coding gain, power gain, etc.) is moderate.

Grouping basis 1: The network side ranks the resources according to the capability of supporting how many terminals to access. The resource group for initial transmission contains first $N_1$ resources capable of supporting a maximum number of terminals to access. As the number of groups increases, the capability of resources in the subsequent resource groups for retransmission in supporting the terminals to access gradually decreases.

Grouping basis 2: The network side ranks the resources according to the performance gain. The resource group for initial transmission contains first $N_1$ resources having the highest performance gain. As the number of groups increases, the performance gain provided by the resources in the subsequent resource groups for retransmission gradually decreases.

Grouping basis 1 is applicable to cases where the network load is high, especially to scenarios where large-scale machines are communicated. The number of terminals accessed to the network is large, but the data volume is small. Grouping basis 2 is applicable to cases where the network load is high.

Embodiment 8

In the resource group mapping mode of the present disclosure, when the terminals select the same resources for initial transmission, due to mapping, especially one-to-one mapping, the terminals will still use the same resources for retransmission, causing collision thereby may lead to decoding failure. Therefore, in the forgoing embodiments, the terminal employs the random backoff mechanism by which the terminal will transmit the retransmitted data after a period of time of random backoff. In this way, even if the terminals use the same resources, the data from the terminals will not conflict because the time to transmit the data is stagger. In this embodiment, several other ways of reducing the retransmission conflict probability will be described.

According to one embodiment, random backoff for retransmission may be performed. This has been described in the foregoing embodiments and will not be repeated here. It is to be noted that the terminal can completely randomly select a backoff time from a backoff time resource pool configured by the network side in advance. For example, the backoff time resource pool can be $\{0,1,2, \ldots Nt\}*Tunit$, where Tunit denotes a unit time. The terminal can randomly select one backoff time value nt from 0-Nt, indicating that the terminal will transmit the retransmitted data after nt unit times. The configuration information of the backoff time resource pool is informed by the network side to each terminal via a downlink channel.

According to other embodiment, employing one-to-many group mapping mode may be performed. That is, a single resource in a former group will be mapped to a multiple of resources in a later group. As illustrated in FIG. 23, the grouped resources employ one-to-many mapping mode.

FIG. 23 is an exemplary diagram of one-to-many mapping between grouped resources in a wireless communication system according to various embodiments of the present disclosure. When both $terminal_A$ and $terminal_B$ select No. 3 resource in the first group of resources 2310 for initial transmission, demodulation failure is resulted from the collision, and the two terminals both receive a retransmission indication (e.g., an NACK signal) from the network side and select the second group of resources 2320 in accordance with the mapping relation between the resource group 2310 for initial transmission and the resource group for retransmission. Since there is a one-to-many mapping relation, $terminal_A$ and $terminal_B$ can select one resource from No. 2, 3, 4 resources in the second group of resources 2320. In this way, the probability of another conflict between $terminal_A$ and $terminal_B$ is only 1/9. If a resource is mapped to more resources (e.g., one-to-four mapping), the probability of another conflict will be further reduced (1/16). Therefore, the one-to-many group mapping mode can reduce the retransmission conflict probability.

According to other embodiment, employing configuration of retransmission time by the system can be adopted. That is, the retransmission time of the terminal is configured by the network side. When two terminals fail in initial transmission, the network side will inform the terminals of a backoff time resource pool containing a multiple of selectable backoff times, in addition to transmitting a retransmission indication (e.g., an NACK signal) to the terminal, and the terminals select one available backoff time. In this way, the retransmission conflict probability is reduced.

FIG. 24 is an exemplary diagram of configuration of a backoff time by the system in a wireless communication system according to various embodiments of the present disclosure.

Referring to FIG. 24, after the demodulation failure is resulted from the collision of the terminals 120 and 130 in steps 2401 and 2403, the base station 110 transmits an NACK signal and a backoff time resource pool containing a multiple of backoff time values in steps 2405 and 2407. The terminals 120 and 130 select a time from the time resource pool in steps 2409 and 2411, and retransmits the data by the uplink channel in steps 2413 and 2415. The base station 110 transmits a correct demodulation indication (e.g., ACK) to the terminals 120 and 130 in steps 2417 and 2419. Now, the backoff times selected by different terminals 120 and 130 may be different. This mode is similar to the first mode, with the difference that the network side configures a multiple of backoff times for a certain one demodulation failure, and that there may be less selectable time values than those in the first completely random backoff mechanism. The retransmitted data from the terminals will be separated in time. In this way, the conflict probability of the retransmitted data can be reduced.

According to other embodiment, backoff can be performed by employing preset rules. That is, the terminal performs backoff in accordance with preset rules, without every configuration by the network side. For example, the preset rules are as follows: the backoff time Tbackoff of the terminal is Num model M (e.g., M=4) multiplied by unit time Tunit, i.e., Tbackoff=[Num mod(M)]*Tunit. The value of M can control the total number of selectable backoff times. For example, If M=4, there are four possible backoff times: 0 Tunit, 1 Tunit, 2 Tunit, and 3 Tunit. In this way, the conflict probability of retransmitted data from the terminals can be reduced. Wherein, the Num can be a random number value (a random number allocated by the network side or a random number set by the terminal itself), or a number value related to the terminal, for example, the terminal ID, the number of information bits transmitted by the terminal, etc.

According to other embodiment, a mechanism of backoff at fixed time can be used. That is, after the terminals access to the network, the network side allocates a same retransmission backoff time $T_{backoff}$ to all terminals while informing the terminals of the grouped resources. It means that all users, who need to transmit retransmitted data, transmit the retransmitted data after a same fixed time from the initial transmission. In this mode, in a case where two terminals select same resources for initial transmission and transmit the initially-transmitted data at different moments, if the data from the two terminals is not correctly decoded and the two terminals receive a retransmission indication, the two terminals will transmit the retransmitted data at different points in time because of the fixed backoff time. Accordingly, conflict is avoided.

Embodiment 9

In a contention-based transmission mode in which resources are allocated by the network side, both the DMRS resources and the multiple access resources used by the terminals are allocated by the network side. That is, $DMRS_{A1}$ and $MA_{A1}$ are allocated to the $terminal_A$ for initial transmission, $DMRS_{A2}$ and $MA_{A2}$ are allocated to the $terminal_A$ for first retransmission, and $DMRS_{Am}$ and $MA_{Am}$ are allocated to the $terminal_A$ for the $m^{th}$ retransmission, wherein (m−1) does not exceed the maximum number of retransmissions. In addition, $DMRS_{B1}$ and $MA_{B1}$ are allocated to the $terminal_B$ for initial transmission, $DMRS_{B2}$ and $MA_{B2}$ are allocated to the $terminal_B$ for first retransmission, and $DMRS_{Bm}$ and $MA_{Bm}$ are allocated to the $terminal_B$ for the n retransmission. Therefore, for a certain terminal, it is unnecessary to know that the resources allocated thereto conflict with resources allocated to other terminals and unnecessary to know the direct mapping relation between the resources. What the terminal only needs to know is the resources used by the terminal itself. The network side knows that resources used by which users conflict. That is, the network side can control the degree of conflict of resources. There can be the following specific configurations, depending upon the load and available conditions.

According to one embodiment, when the network load is low, the network side allocates different DMRS resources and/or multiple access resources for terminals. In this case, no matter when the terminals transmit data, no conflict will occur.

According to other embodiment, when the network load is high, the network side allocates same DMRS resources and multiple access resources to a multiple of terminals (that is, resources used by those users conflict), but allocates different times for the conflicting terminals to transmit data. That is, it is assumed that the resources allocated to $terminal_A$ and $terminal_B$ are the same ($terminal_A$ and $terminal_B$ are conflicting users). Since time $T_1$ is allocated to $terminal_A$ to require $terminal_A$ to transmit the initially-transmitted data after time $T_1$ and (if necessary) to transmit the retransmitted data after time T from the transmitting of the initially-transmitted data, and time $T_2$ is allocated to $terminal_B$ to require $terminal_B$ to transmit the initially-transmitted data after time $T_B$ and (if necessary) to transmit the retransmitted data after time T from the transmitting of the initially-transmitted data, $T_1 \neq T_2$, the transmitting of data by the two terminals is separated and conflict is thus avoided. Once the two terminals need to transmit the retransmitted data, the same retransmission time interval ensures that the retransmitted data from the two terminals will not conflict.

According to other embodiment, when the network load is high, the network side allocates same DMRS resources and multiple access resources to a multiple of terminals (that is, resources used by those users conflict). Moreover does not allocate times for those conflicting users to transmit data. Instead, the users themselves select times to transmit data:

a) A set of times at which it is allowed to transmit data, $T_{trans} = \{T_1, T_2, T_3 \ldots T_N\}$, can be configured, and a user freely selects one time from the set of times to transmit data (initially-transmitted data or retransmitted data).

b) It is possible that a user transmits data in accordance with the arriving time of the data to be transmitted. For example, once data to be transmitted gets ready, the data (initially-transmitted data or retransmitted data) is transmitted.

Therefore, those conflicting users may select a same time to transmit data, leading to data conflict. When those conflicting users need to transmit the retransmitted data, they can select different times to transmit the retransmitted data, in order to reduce the conflict probability of the retransmitted data.

The network side informs the user of the allocated resource information via a downlink channel, i.e., a physical broadcast channel, a physical downlink control channel, or a physical downlink shared channel. If the network side configures transmitting time information or a set of selectable transmitting times, the network side also informs the user of the transmitting time information or the set of selectable transmitting times.

Embodiment 10

In the foregoing embodiments, the network side divides the available DMRS resources and/or multiple access resources into a multiple of groups respectively for initial-transmitted data and retransmitted data. In this embodiment, a method for adjusting the resource groups will be described, By adjusting the resource groups, the utilization of the existing resources can be improved, the waste of resources can be reduced, and meanwhile the requirements of the system can be met. Specifically:

According to one embodiment, when the network load is low or when the channel condition within a cell is good (that is, high possibility of correctly decoding the data by the first transmission, also low retransmission probability), the network side can allocate more resources to the resource group for initial transmission, and less resources to the resource group for retransmission (many-to-one mapping can be used) by reducing the number of resource groups (that is the number of the resource groups for retransmission is reduced).

According to other embodiment, when the network load is high or when the channel condition within a cell is poor (that is, high possibility of correctly decoding the data by many retransmissions), the network side evenly allocates the available multiple access resources to the resource groups (one-to-one mapping or even one-to-many mapping can be used).

FIG. 25 is a structural block diagram of a retransmitted data receiving device for non-orthogonal multiple access in a wireless communication system according to various embodiments of the present disclosure. FIG. 25 is a configuration of a base station (e.g., the base station 110), and can be understood as a part of the wireless communication unit 210 and the control unit 240 in FIG. 2.

Referring to FIG. 25, the receiving device comprises a resource configuration determination unit 2510 configured to determine resource configuration information and inform a data transmitter of the resource configuration information via a downlink channel, a first data receiving unit 2520 configured to receive and decode initially-transmitted data, a retransmission indication unit 2530 configured to transmit a retransmission indication signal when the decoding fails, a second data receiving unit 2540 configured to receive retransmitted data, and determine initially-transmitted data corresponding to the retransmitted data according to the resource configuration information, and a data combining unit 2550 configured to combine the retransmitted data and the initially-transmitted data to detect correct transmission data.

FIG. 26 is a structural block diagram of a retransmitted data transmitting device for non-orthogonal multiple access in a wireless communication system according to various embodiments of the present disclosure. FIG. 26 is a configuration of the terminal (e.g., the terminal 120 or the terminal 130), and can be understood as a part of the communication unit 310 and the control unit 330 in FIG. 3.

Referring to FIG. 25, the transmitting device comprises a resource configuration information reading unit 2610 configured to read received resource configuration information, a first data transmitting unit 2620 configured to transmit initially-transmitted data based on the resource configuration information, a receiving unit 2630 configured to receive a retransmission indication signal, a resource determination unit 2640 configured to read the resource configuration information, and determine resources for retransmission, and a second data transmitting unit 2650 configured to transmit retransmitted data based on the determined resources for retransmission.

Methods according to embodiments stated in claims or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. A method performed by a terminal in a wireless communication system, the method comprising:
    receiving, from a base station, resource configuration information for indicating a mapping relationship between a first resource for an initial transmission to the base station and a second resource for a retransmission to the base station;
    transmitting, to the base station, first data through the first resource;
    transmitting, to the base station, second data through the second resource when the terminal receives a retransmission indication from the base station; and
    if a number of the retransmissions is equal to or greater than a threshold, transmitting, to the base station, a resource update request message, wherein the resource update request message includes information indicating a lower coding rate than a coding rate of transmission of the second data, and
    wherein the second resource is determined based on the first resource and the mapping relationship.

2. The method of claim 1, wherein the resource configuration information indicates the mapping relationship between a first group of resources including the first resource for the initial transmission and a second group of resources including the second resource for the retransmission.

3. The method of claim 2, wherein each of the first group of resources and the second group of resources is one of a demodulation reference signal (DMRS) resource group or a multiple access resource group.

4. A base station in a wireless communication system, the base station comprising:
a transceiver; and
at least one processor operably coupled to the transceiver, wherein the transceiver is configured to:
transmit, to a terminal, resource configuration information for indicating a mapping relationship between a first resource for an initial transmission to the base station and a second resource for a retransmission to the base station,
receive, from the terminal, first data through the first resource,
receive, from the terminal, second data through the second resource when the base station transmits a retransmission indication to the terminal, and
if a number of the retransmissions is equal to or greater than a threshold, receive, from the terminal, a resource update request message, wherein the resource update request message includes information indicating a lower coding rate than a coding rate of transmission of the second data, and
wherein the second resource is determined based on the first resource and the mapping relationship.

5. The base station of claim 4, wherein the resource configuration information indicates the mapping relationship between a first group of resources including the first resource for the initial transmission and a second group of resources including the second resource for the retransmission.

6. The base station of claim 5, wherein each of the first group of resources and the second group of resources is one of a demodulation reference signal (DMRS) resource group or a multiple access resource group.

7. A terminal in a wireless communication system, the terminal comprising:
a transceiver; and
at least one processor operably coupled to the transceiver, wherein the transceiver configured to:
receive, from a base station, resource configuration information for indicating a mapping relationship between a first resource for an initial transmission to the base station and a second resource for a retransmission to the base station,
transmit, to the base station, first data through the first resource,
transmit, to the base station, second data through the second resource when the terminal receives a retransmission indication from the base station, and
if a number of the retransmissions is equal to or greater than a threshold, transmit, to the base station, a resource update request message, wherein the resource update request message includes information indicating a lower coding rate than a coding rate of transmission of the second data, and
wherein the second resource is determined based on the first resource and the mapping relationship.

8. The terminal of claim 7, wherein the resource configuration information indicates the mapping relationship between a first group of resources including the first resource for the initial transmission and a second group of resources including the second resource for the retransmission.

9. The terminal of claim 8, wherein each of the first group of resources and the second group of resources is one of a demodulation reference signal (DMRS) resource group or a multiple access resource group.

10. The method of claim 2, wherein the first group of resources and the second group of resources are mapped by one of a one-to-one mapping scheme, a one-to-many mapping scheme or a many-to-one mapping scheme between the first group of resources and the second group of resources.

11. The method of claim 2, wherein the first group of resources and the second group of resources correspond to different redundancy versions.

12. The method of claim 1, wherein an interval between the initial transmission and the retransmission is determined based on a random backoff.

13. The base station of claim 5, wherein the first group of resources and the second group of resources correspond to different redundancy versions.

14. The base station of claim 4, wherein an interval between the initial transmission and the retransmission is determined based on a random backoff.

15. The terminal of claim 8, wherein the first group of resources and the second group of resources are mapped by a one of one-to-one mapping scheme, a one-to-many mapping scheme or a many-to-one mapping scheme between the first group of resources and the second group of resources.

16. The terminal of claim 8, wherein the first group of resources and the second group of resources correspond to different redundancy versions.

17. The terminal of claim 7, wherein an interval between the initial transmission and the retransmission is determined based on a random backoff.

18. The method of claim 1, wherein the resource update request message comprises information indicating a greater power gain than a power gain of transmission of the second data.

* * * * *